US007660887B2

(12) United States Patent
Reedy et al.

(10) Patent No.: US 7,660,887 B2
(45) Date of Patent: Feb. 9, 2010

(54) SYSTEMS AND METHODS FOR PROVIDING DYNAMIC QUALITY OF SERVICE FOR A DISTRIBUTED SYSTEM

(75) Inventors: Dennis G. Reedy, Manassas, VA (US); Larry J. Mitchell, Toronto (CA)

(73) Assignee: Sun Microsystems, Inc., Santa Clara, CA (US)

( * ) Notice: Subject to any disclaimer, the term of this patent is extended or adjusted under 35 U.S.C. 154(b) by 1102 days.

(21) Appl. No.: 10/390,895

(22) Filed: Mar. 19, 2003

(65) Prior Publication Data

US 2004/0030777 A1 Feb. 12, 2004

Related U.S. Application Data

(63) Continuation-in-part of application No. 09/947,528, filed on Sep. 7, 2001, now abandoned.

(60) Provisional application No. 60/378,957, filed on May 10, 2002.

(51) Int. Cl.
*G06F 15/173* (2006.01)

(52) U.S. Cl. .................. 709/224; 709/223; 709/225; 709/226; 709/227; 709/228; 709/232

(58) Field of Classification Search ................ 709/224, 709/223, 229, 225, 226, 227, 228, 232
See application file for complete search history.

(56) References Cited

U.S. PATENT DOCUMENTS 4,430,699 A 2/1984 Segarra et al.

(Continued)

FOREIGN PATENT DOCUMENTS

| EP | 0 300 516 A2 | 1/1989 |
| EP | 0 351 536 A3 | 1/1990 |
| EP | 0 384 339 A3 | 8/1990 |
| EP | 0 472 874 A1 | 3/1992 |
| EP | 0 474 340 A2 | 3/1992 |

(Continued)

OTHER PUBLICATIONS

Agha et al., "Actorspaces: An Open Distributed Programming Paradigm," University of Illinois, Report No. UIUCDCS-R-92-1766, Open Systems Laboratory TR No. 8, pp. 1-12, Nov. 1992.

(Continued)

*Primary Examiner*—Ario Etienne
*Assistant Examiner*—Barbara N Burgess
(74) *Attorney, Agent, or Firm*—Sonnenschein Nath & Rosenthal LLP

(57) ABSTRACT

Methods and systems consistent with certain aspects related to the present invention provide a dynamic service delivery system based on a capability to provide services through a distributed system using qualitative and quantitative Quality of Service (QoS) attributes. In accordance with one aspect of the invention, a method for providing a service that includes collecting capability information reflecting a current operating condition of a compute resource and determining a platform capability and a measurable capability value for a depletion-oriented characteristic of the compute resource based on the collected capability information. Based on at least one of the platform capability and the measurable capability value; a capability value for the compute resource is determined and this value is provided to a provision manager that determines whether the compute resource is worthy of being an available resource in the distributed system based on the capability value. Additionally, the provision manager may determine which of a plurality of services provided by compute resources is more capable of handling a service request based on service capability values corresponding to platform capabilities and/or the depletion-oriented characteristics of each of the compute resources.

35 Claims, 19 Drawing Sheets

U.S. PATENT DOCUMENTS

| | | |
|---|---|---|
| 4,491,946 A | 1/1985 | Kryskow, Jr. et al. |
| 4,558,413 A | 12/1985 | Schmidt et al. |
| 4,567,359 A | 1/1986 | Lockwood |
| 4,713,806 A | 12/1987 | Oberlander et al. |
| 4,800,488 A | 1/1989 | Agrawal et al. |
| 4,809,160 A | 2/1989 | Mahon et al. |
| 4,823,122 A | 4/1989 | Mann et al. |
| 4,939,638 A | 7/1990 | Stephenson et al. |
| 4,956,773 A | 9/1990 | Saito et al. |
| 4,992,940 A | 2/1991 | Dworkin |
| 5,088,036 A | 2/1992 | Ellis et al. |
| 5,101,346 A | 3/1992 | Ohtsuki |
| 5,109,486 A | 4/1992 | Seymour |
| 5,187,787 A | 2/1993 | Skeen et al. |
| 5,218,699 A | 6/1993 | Brandle et al. |
| 5,253,165 A | 10/1993 | Leiseca et al. |
| 5,257,369 A | 10/1993 | Skeen et al. |
| 5,293,614 A | 3/1994 | Ferguson et al. |
| 5,297,283 A | 3/1994 | Kelly, Jr. et al. |
| 5,303,042 A | 4/1994 | Lewis et al. |
| 5,307,490 A | 4/1994 | Davidson et al. |
| 5,311,591 A | 5/1994 | Fischer |
| 5,319,542 A | 6/1994 | King, Jr. et al. |
| 5,327,559 A | 7/1994 | Priven et al. |
| 5,339,430 A | 8/1994 | Lundin et al. |
| 5,339,435 A | 8/1994 | Lubkin et al. |
| 5,341,477 A | 8/1994 | Pitkin et al. |
| 5,386,568 A | 1/1995 | Wold et al. |
| 5,390,328 A | 2/1995 | Frey et al. |
| 5,392,280 A | 2/1995 | Zheng |
| 5,423,042 A | 6/1995 | Jalili et al. |
| 5,440,744 A | 8/1995 | Jacobson et al. |
| 5,446,901 A | 8/1995 | Owicki et al. |
| 5,448,740 A | 9/1995 | Kiri et al. |
| 5,452,459 A | 9/1995 | Drury et al. |
| 5,455,952 A | 10/1995 | Gjovaag |
| 5,459,837 A | 10/1995 | Caccavale |
| 5,471,629 A | 11/1995 | Risch |
| 5,475,792 A | 12/1995 | Stanford et al. |
| 5,475,817 A | 12/1995 | Waldo et al. |
| 5,475,840 A | 12/1995 | Nelson et al. |
| 5,481,721 A | 1/1996 | Serlet et al. |
| 5,491,791 A | 2/1996 | Glowny et al. |
| 5,504,921 A | 4/1996 | Dev et al. |
| 5,506,984 A | 4/1996 | Miller |
| 5,511,196 A | 4/1996 | Shackelford et al. |
| 5,511,197 A | 4/1996 | Hill et al. |
| 5,524,244 A | 6/1996 | Robinson et al. |
| 5,544,040 A | 8/1996 | Gerbaulet |
| 5,548,724 A | 8/1996 | Akizawa et al. |
| 5,548,726 A | 8/1996 | Pettus |
| 5,553,282 A | 9/1996 | Parrish et al. |
| 5,555,367 A | 9/1996 | Premerlani et al. |
| 5,555,427 A | 9/1996 | Aoe et al. |
| 5,557,798 A | 9/1996 | Skeen et al. |
| 5,560,003 A | 9/1996 | Nilsen et al. |
| 5,561,785 A | 10/1996 | Blandy et al. |
| 5,577,231 A | 11/1996 | Scalzi et al. |
| 5,592,375 A | 1/1997 | Salmon et al. |
| 5,594,921 A | 1/1997 | Pettus |
| 5,603,031 A | 2/1997 | White et al. |
| 5,617,537 A | 4/1997 | Yamada et al. |
| 5,628,005 A | 5/1997 | Hurvig |
| 5,640,564 A | 6/1997 | Hamilton et al. |
| 5,644,720 A | 7/1997 | Boll et al. |
| 5,644,768 A | 7/1997 | Periwal et al. |
| 5,652,888 A | 7/1997 | Burgess |
| 5,655,148 A | 8/1997 | Richman et al. |
| 5,659,751 A | 8/1997 | Heninger |
| 5,664,110 A | 9/1997 | Green et al. |
| 5,664,111 A | 9/1997 | Nahan et al. |
| 5,664,191 A | 9/1997 | Davidson et al. |
| 5,666,493 A | 9/1997 | Wojcik et al. |
| 5,671,225 A | 9/1997 | Hooper et al. |
| 5,671,279 A | 9/1997 | Elgamal |
| 5,675,796 A | 10/1997 | Hodges et al. |
| 5,675,797 A | 10/1997 | Chung et al. |
| 5,680,573 A | 10/1997 | Rubin et al. |
| 5,680,617 A | 10/1997 | Gough et al. |
| 5,682,534 A | 10/1997 | Kapoor et al. |
| 5,684,955 A | 11/1997 | Meyer et al. |
| 5,689,709 A | 11/1997 | Corbett et al. |
| 5,694,551 A | 12/1997 | Doyle et al. |
| 5,706,435 A | 1/1998 | Barbara et al. |
| 5,706,502 A | 1/1998 | Foley et al. |
| 5,710,887 A | 1/1998 | Chelliah et al. |
| 5,715,314 A | 2/1998 | Payne et al. |
| 5,721,825 A | 2/1998 | Lawson et al. |
| 5,721,832 A | 2/1998 | Westrope et al. |
| 5,724,540 A | 3/1998 | Kametani |
| 5,724,588 A | 3/1998 | Hill et al. |
| 5,727,048 A | 3/1998 | Hiroshima et al. |
| 5,727,145 A | 3/1998 | Nessett et al. |
| 5,729,594 A | 3/1998 | Klingman |
| 5,737,607 A | 4/1998 | Hamilton et al. |
| 5,742,768 A | 4/1998 | Gennaro et al. |
| 5,745,678 A | 4/1998 | Herzberg et al. |
| 5,745,695 A | 4/1998 | Gilchrist et al. |
| 5,745,703 A | 4/1998 | Cejtin et al. |
| 5,745,755 A | 4/1998 | Covey |
| 5,748,897 A | 5/1998 | Katiyar |
| 5,754,849 A | 5/1998 | Dyer et al. |
| 5,754,977 A | 5/1998 | Gardner et al. |
| 5,757,925 A | 5/1998 | Faybishenko |
| 5,758,077 A | 5/1998 | Danahy et al. |
| 5,758,328 A | 5/1998 | Giovannoli |
| 5,758,344 A | 5/1998 | Prasad et al. |
| 5,761,507 A | 6/1998 | Govett |
| 5,761,656 A | 6/1998 | Ben-Shachar |
| 5,764,897 A | 6/1998 | Khalidi |
| 5,764,915 A | 6/1998 | Heimsoth et al. |
| 5,768,532 A | 6/1998 | Megerian |
| 5,774,551 A | 6/1998 | Wu et al. |
| 5,774,729 A | 6/1998 | Carney et al. |
| 5,778,179 A | 7/1998 | Kanai et al. |
| 5,778,187 A | 7/1998 | Monteiro et al. |
| 5,778,228 A | 7/1998 | Wei |
| 5,778,368 A | 7/1998 | Hogan et al. |
| 5,784,560 A | 7/1998 | Kingdon et al. |
| 5,787,425 A | 7/1998 | Bigus |
| 5,787,431 A | 7/1998 | Shaughnessy |
| 5,790,548 A | 8/1998 | Sistanizadeh et al. |
| 5,790,677 A | 8/1998 | Fox et al. |
| 5,794,207 A | 8/1998 | Walker et al. |
| 5,799,173 A | 8/1998 | Gossler et al. |
| 5,802,367 A | 9/1998 | Held et al. |
| 5,805,805 A | 9/1998 | Civanlar et al. |
| 5,806,042 A | 9/1998 | Kelly et al. |
| 5,808,911 A | 9/1998 | Tucker et al. |
| 5,809,144 A | 9/1998 | Sirbu et al. |
| 5,809,507 A | 9/1998 | Cavanaugh, III |
| 5,812,819 A | 9/1998 | Rodwin et al. |
| 5,813,013 A | 9/1998 | Shakib et al. |
| 5,815,149 A | 9/1998 | Mutschler, III et al. |
| 5,815,709 A | 9/1998 | Waldo et al. |
| 5,815,711 A | 9/1998 | Sakamoto et al. |
| 5,818,448 A | 10/1998 | Katiyar |
| 5,829,022 A | 10/1998 | Watanabe et al. |
| 5,832,219 A | 11/1998 | Pettus |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |

| | | |
|---|---|---|
| 5,845,090 A | 12/1998 | Collins, III et al. |
| 5,845,129 A | 12/1998 | Wendorf et al. |
| 5,850,442 A | 12/1998 | Miftic |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,872,973 A | 2/1999 | Mitchell et al. |
| 5,875,335 A | 2/1999 | Beard |
| 5,878,411 A | 3/1999 | Borroughs et al. |
| 5,884,024 A | 3/1999 | Lim et al. |
| 5,884,079 A | 3/1999 | Furusawa |
| 5,887,134 A | 3/1999 | Ebrahim |
| 5,889,951 A | 3/1999 | Lombardi |
| 5,890,158 A | 3/1999 | House et al. |
| 5,892,904 A | 4/1999 | Atkinson et al. |
| 5,913,029 A | 6/1999 | Shostak |
| 5,915,112 A | 6/1999 | Boutcher |
| 5,925,108 A | 7/1999 | Johnson et al. |
| 5,933,497 A | 8/1999 | Beetcher et al. |
| 5,933,647 A | 8/1999 | Aronberg et al. |
| 5,935,249 A | 8/1999 | Stern et al. |
| 5,940,827 A | 8/1999 | Hapner et al. |
| 5,944,793 A | 8/1999 | Islam et al. |
| 5,946,485 A | 8/1999 | Weeren et al. |
| 5,946,694 A | 8/1999 | Copeland et al. |
| 5,949,998 A | 9/1999 | Fowlow et al. |
| 5,951,652 A | 9/1999 | Ingrassia, Jr. et al. |
| 5,956,509 A | 9/1999 | Kevner |
| 5,961,582 A | 10/1999 | Gaines |
| 5,963,924 A | 10/1999 | Williams et al. |
| 5,963,947 A | 10/1999 | Ford et al. |
| 5,966,531 A | 10/1999 | Skeen et al. |
| 5,969,967 A | 10/1999 | Aahlad et al. |
| 5,974,201 A | 10/1999 | Chang et al. |
| 5,978,484 A | 11/1999 | Apperson et al. |
| 5,978,773 A | 11/1999 | Hudetz et al. |
| 5,982,773 A | 11/1999 | Nishimura et al. |
| 5,987,506 A | 11/1999 | Carter et al. |
| 5,991,808 A | 11/1999 | Broder et al. |
| 5,996,075 A | 11/1999 | Matena |
| 5,999,179 A | 12/1999 | Kekic et al. |
| 5,999,988 A | 12/1999 | Pelegri-Llopart et al. |
| 6,003,050 A | 12/1999 | Silver et al. |
| 6,003,065 A | 12/1999 | Yan et al. |
| 6,003,763 A | 12/1999 | Gallagher et al. |
| 6,009,103 A | 12/1999 | Woundy |
| 6,009,413 A | 12/1999 | Webber et al. |
| 6,009,464 A | 12/1999 | Hamilton et al. |
| 6,014,686 A | 1/2000 | Elnozahy et al. |
| 6,016,496 A | 1/2000 | Roberson |
| 6,016,516 A | 1/2000 | Horikiri |
| 6,018,619 A | 1/2000 | Allard et al. |
| 6,023,586 A | 2/2000 | Gaisford et al. |
| 6,026,414 A | 2/2000 | Anglin |
| 6,031,977 A | 2/2000 | Pettus |
| 6,032,151 A | 2/2000 | Arnold et al. |
| 6,034,925 A | 3/2000 | Wehmeyer |
| 6,044,381 A | 3/2000 | Boothby et al. |
| 6,052,761 A | 4/2000 | Hornung et al. |
| 6,055,562 A | 4/2000 | Devarakonda et al. |
| 6,058,381 A | 5/2000 | Nelson |
| 6,058,383 A | 5/2000 | Narasimhalu et al. |
| 6,061,699 A | 5/2000 | DiCecco et al. |
| 6,061,713 A | 5/2000 | Bharadhwaj |
| 6,067,575 A | 5/2000 | McManis et al. |
| 6,078,655 A | 6/2000 | Fahrer et al. |
| 6,085,255 A | 7/2000 | Vincent et al. |
| 6,092,194 A | 7/2000 | Touboul |
| 6,093,216 A | 7/2000 | Adl-Tabatabai et al. |
| 6,101,528 A | 8/2000 | Butt |
| 6,104,716 A | 8/2000 | Crichton et al. |
| 6,108,346 A | 8/2000 | Doucette et al. |
| 6,134,603 A | 10/2000 | Jones et al. |
| 6,154,844 A | 11/2000 | Touboul et al. |
| 6,157,960 A | 12/2000 | Kaminsky et al. |
| 6,182,083 B1 | 1/2001 | Scheifler et al. |
| 6,185,602 B1 | 2/2001 | Bayrakeri |
| 6,185,611 B1 | 2/2001 | Waldo et al. |
| 6,189,046 B1 | 2/2001 | Moore et al. |
| 6,192,044 B1 | 2/2001 | Mack |
| 6,199,068 B1 | 3/2001 | Carpenter |
| 6,199,116 B1 | 3/2001 | May et al. |
| 6,212,578 B1 | 4/2001 | Racicot |
| 6,216,138 B1 | 4/2001 | Wells et al. |
| 6,216,158 B1 | 4/2001 | Luo et al. |
| 6,219,675 B1 | 4/2001 | Pal et al. |
| 6,226,746 B1 | 5/2001 | Scheifler |
| 6,243,716 B1 | 6/2001 | Waldo et al. |
| 6,243,814 B1 | 6/2001 | Matena |
| 6,247,091 B1 | 6/2001 | Lovett |
| 6,253,256 B1 | 6/2001 | Wollrath et al. |
| 6,263,350 B1 | 7/2001 | Wollrath et al. |
| 6,263,379 B1 | 7/2001 | Atkinson et al. |
| 6,272,559 B1 | 8/2001 | Jones et al. |
| 6,282,295 B1 | 8/2001 | Young et al. |
| 6,282,568 B1 | 8/2001 | Sondur et al. |
| 6,282,581 B1 | 8/2001 | Moore et al. |
| 6,292,934 B1 | 9/2001 | Davidson et al. |
| 6,301,613 B1 | 10/2001 | Ahlstrom et al. |
| 6,321,275 B1 | 11/2001 | McQuistan et al. |
| 6,327,677 B1 | 12/2001 | Garg et al. |
| 6,339,783 B1 | 1/2002 | Horikiri |
| 6,343,308 B1 | 1/2002 | Marchesseault |
| 6,360,266 B1 | 3/2002 | Pettus |
| 6,363,409 B1 | 3/2002 | Hart et al. |
| 6,385,643 B1 | 5/2002 | Jacobs et al. |
| 6,408,342 B1 | 6/2002 | Moore et al. |
| 6,418,468 B1 | 7/2002 | Ahlstrom et al. |
| 6,564,174 B1 | 5/2003 | Ding et al. |
| 6,578,074 B1 | 6/2003 | Bahlmann |
| 6,603,772 B1 | 8/2003 | Moussavi et al. |
| 6,604,127 B2 | 8/2003 | Murphy et al. |
| 6,604,140 B1 | 8/2003 | Beck et al. |
| 6,654,793 B1 | 11/2003 | Wollrath et al. |
| 6,704,803 B2 | 3/2004 | Wilson et al. |
| 6,757,262 B1 | 6/2004 | Weisshaar et al. |
| 6,757,729 B1 | 6/2004 | Devarakonda et al. |
| 6,782,421 B1 * | 8/2004 | Soles et al. ................. 709/223 |
| 6,801,940 B1 | 10/2004 | Moran et al. |
| 6,801,949 B1 | 10/2004 | Bruck et al. |
| 6,804,711 B1 | 10/2004 | Dugan et al. |
| 2002/0059212 A1 | 5/2002 | Takagi |
| 2002/0105908 A1* | 8/2002 | Blumer et al. ............... 370/230 |
| 2002/0111814 A1 | 8/2002 | Barnett et al. |
| 2003/0005132 A1 | 1/2003 | Nguyen et al. |
| 2003/0074443 A1* | 4/2003 | Melaku et al. ............... 709/224 |
| 2003/0191842 A1 | 10/2003 | Murphy et al. |
| 2006/0036642 A1* | 2/2006 | Horvitz et al. ............... 707/102 |
| 2006/1003664 * | 2/2006 | Horvitz et al. ............... 707/102 |
| 2006/0059253 A1* | 3/2006 | Goodman et al. ........... 709/223 |

FOREIGN PATENT DOCUMENTS

| | | |
|---|---|---|
| EP | 497 022 A1 | 8/1992 |
| EP | 0 555 997 A2 | 8/1993 |
| EP | 0 565 849 A2 | 10/1993 |
| EP | 0 569 195 A3 | 11/1993 |
| EP | 0 625 750 A2 | 11/1994 |
| EP | 0 635 792 A2 | 1/1995 |
| EP | 0 651 328 A1 | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |

| | | |
|---|---|---|
| EP | 0 778 520 A2 | 6/1997 |
| EP | 0 794 493 A2 | 9/1997 |
| EP | 0 803 810 A2 | 10/1997 |
| EP | 0 803 811 A2 | 10/1997 |
| EP | 0 805 393 A2 | 11/1997 |
| EP | 0 810 524 A1 | 12/1997 |
| EP | 0 817 020 A2 | 1/1998 |
| EP | 0 817 022 A2 | 1/1998 |
| EP | 0 817 025 A2 | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 | 4/1992 |
| WO | WO92/09948 | 6/1992 |
| WO | WO93/25962 A1 | 12/1993 |
| WO | WO94/03855 | 2/1994 |
| WO | WO96/03692 | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |
| WO | WO 99/17194 | 4/1999 |
| WO | WO 99/17194 A1 | 4/1999 |
| WO | WO 01/13228 A2 | 2/2001 |
| WO | WO 01/86394 A2 | 11/2001 |
| WO | WO 01/90903 A1 | 11/2001 |

OTHER PUBLICATIONS

Ahmed et al., "A Program Building Tool for Parallel Applications," Yale University, pp. 1-23, Dec. 1, 1993.
Aldrich et al., "Providing Easier Access to Remote Objects in Client-Server Systems," System Sciences, 1998, Proceedings of the 31st Hawaii Internat'l. Conference, Jan. 6-9, 1998, pp. 366-375.
Aldrich et al., "Providing Easier Access to Remote Objects in Distributed Systems," Calif. Institute of Technology, www.cs.caltech.edu/%7Ejedi/paper/jedipaper.html, Nov. 21, 1997.
Alexander et al., "Active Bridging," Proceedings of the ACM/SIGCOMM'97 Conference, Cannes, France, Sep. 1997.
Anderson et al., "Persistent Linda: Linda + Transactions + Query Processing," Proceedings of the 13th Symposium on Fault Tolerant Systems, pp. 93-109, 1991.
Anonymous, "Change-Notification Service for Shared Files," IBM Technical Disclosure Bulletin, vol. 36, No. 8, pp. 77-82, XP002108713, New York, US, Aug. 1993.
Anonymous, "Resource Preemption for Priority Scheduling," IBM Technical Disclosure Bulletin, vol. 16, No. 6, p. 1931, XP002109435 New York, US, Nov. 1973.
Bandrowski, "Stores Without Doors: Kiosks Generate New Profits," Corporate Computing, Oct. 1992, pp. 193-195.
Beech et al., "Object Databases as Generalizations of Relational Databases," Computer Standards & Interfaces, vol. 13, Nos. 1/3, pp. 221-230, Amsterdam, NL, Jan. 1991.
Bertino et al., "Object-Oriented Database Management Systems: Concepts and Issues," Computer, vol. 24, No. 4, pp. 33-47, Los Alamitos, CA, Apr. 1991.
Betz et al., "Interoperable Objects: Laying the Foundation for Distributed Object Computing," Dr. Dobb's Journal, vol. 19, No. 11, p. 18(13), Oct. 1994.
Bevan et al., "An Efficient Reference Counting Solution to the Distributed Garbage Collection Problem," Parallel Computing, NL, Elsevier Science Publishers, Amsterdam, vol. 9, No. 2, pp. 179-192, Jan. 1989.
Birrell et al., "Distributed Garbage Collection for Network Objects," Digital Systems Research Center, No. 116, pp. 1-18, Dec. 15, 1993.
Birrell et al., "Grapevine: An Exercise in Distributed Computing," Communications of the ACM, vol. 25, No. 4, pp. 260-274, Apr. 1982.
Birrell et al., "Implementing Remote Procedure Calls," ACM Transactions on Computer Systems, vol. 2, No. 1, pp. 39-59, Feb. 1984.
Birrell et al., "Network Objects," DEC SRC Research Report 115, Feb. 28, 1994.
Birrell et al., "Network Objects," Operating Systems Review, 27(5), pp. 217-230, Dec. 1993.
Bruno, "Working the Web," Data Communications, Apr. 1997, pp. 50-60.
Burns et al., "An Analytical Study of Opportunistic Lease Renewal," Distributed Computing Systems, 21st International Conference, pp. 146-153, Apr. 2000.
Cannon et al., "Adding Fault-Tolerant Transaction Processing to LINDA," Software-Practice and Experience, vol. 24(5), pp. 449-466, May 1994.
Cardelli, "Obliq, A Lightweight Language for Network Objects," Digital SRC, pp. 1-37, Nov. 5, 1993.
Carriero et al., "Distributed Data Structures in Linda," Principles of Programming Language, pp. 1-16,1986.
Carriero et al., "Distributed Data Structures in Linda,"Yale Research Report YALEU/DCS/RR-438, Nov. 1985.
Chung et al., "A 'Tiny' Pascal Compiler: Part 1: The P-Code Interpreter," BYTE Publications, Inc., Sep. 1978.
Chung et al., "A 'Tiny' Pascal Compiler: Part 2: The P-Compiler," BYTE Publications, Inc., Oct. 1978.
Cohen, "Electronic Commerce," USC/Information Sciences Institute, Oct. 1989.
Conhaim, "Online shopping: a beginner's guide; includes related listing of videotex services," Link-Up, vol. 5, No. 6, p. 32, Nov. 1988.
"Consumers Can View, Share Picture On-Line as Kodak Picture Network Goes 'Live'," Business Wire, Aug. 25, 1997, pp. 18-19.
Coulouris et al., "Distributed Systems Concepts and Designs," Second Edition, Addison-Wesley, 1994.
Dave et al., "Proxies, Application Interface, and Distributed Systems," Proceedings International Workshop on Object Orientation in Operating Systems, pp. 212-220, Sep. 24, 1992.
Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1-6.
Deux et al., "The O2 System," Communications of the Association for Computing Machinery, vol. 34, No. 10, pp. 34-48, Oct. 1, 1991.
Dijkstra, "Self-stabilizing Systems in Spite of Distributed Control," Communications of the ACM, vol. 17, No. 11, pp. 643-644, Nov. 1974.
Dolev et al., "On the Minimal Synchronism Needed for Distributed Consensus," Journal of the ACM, vol. 34, No. 1, pp. 77-97, Jan. 1987.
Dollimore et al., "The Design of a System for Distributing Shared Objects," The Computer Journal, No. 6, Cambridge, GB, Dec. 1991.
Dourish, "A Divergence-Based Model of Synchrony and Distribution in Collaborative Systems," Xerox Technical Report EPC-1194-102, pp. 1-10, 1994.
Drexler et al., "Incentive Engineering for Computational Resource Management," The Ecology of Computation, Elsevier Science Publishers B.V., pp. 231-266, 1988.
Droms, "RFC 1541 Dynamic Host Configuration Protocol," <http://www.cis.ohio-state.edu/htbin/rfc/rfc1541.html>, pp. 1-33, Oct. 1993.
Ellsworth, "Boom Town," Internet World, Jun. 1995, pp. 33-35.
Estrin, "Inter-Organization Networks: Implications of Access Control Requirements for Interconnection Protocols," ACM, 1986, pp. 254-263.
Emms, "A Definition of an Access Control Systems Language," Computer Standards and Interfaces, vol. 6, No. 4, pp. 443-454, Jan. 1, 1987.
Fleisch et al., "High Performance Distributed Objects Using Distributed Shared Memory & Remote Method Invocation," System Sciences, 1998, Proceedings of the 31st Hawaii Internat'l. Conference, Jan. 6-9, 1998, pp. 574-578.
Fleischer, "SkyMall's 'Supplier Network' Takes Flight", Retailtech, The Technology Magazine for Retail Executives, Apr. 1997.
Foley, "Managing Campus-Wide Information Systems: Issues and Problems," Capitalizing on Communication, ACM SIGUCCS XVII, 1989, pp. 169-174.
Fryxell, "eaasySABRE," Link-Up, May/Jun. 1996, pp. 10-11.
Gardner, "Kodak Follows Startup Into Online Photo Processing Business," Internet World, Sep. 8, 1997, pp. 5-6.

Gelernter et al., "Parallel Programming in Linda," Yale University, pp. 1-21, Jan. 1985.

Gelernter, "Generative Communication in Linda," ACM Transactions on Programming Languages and Systems, vol. 7, No. 1, pp. 80-112, Jan. 1985.

Gogan et al., "Open Market, Inc.: Managing in a Turbulent Environment," Harvard Business School Publishing, Aug. 29, 1996, pp. 1-30.

Gosling et al., "The Java (TM) Language Specification," Addison-Wesley, 1996.

Gottlob et al., "Extending Object-Oriented Systems with Roles," ACM Transactions on Information Systems, vol. 14, No. 3, pp. 268-296, Jul. 1996.

Gray et al., "Leases: An Efficient Fault-Tolerant Mechanism for Distributed File Cache Consistency," ACM, pp. 202-210, 1989.

Guth, "JavaOne: Sun to Expand Java Distributed Computing Effort," <http://www.sunworld.com/swol-02-1998/swol-02-sunspots.html>, XP-002109935, p. 1, Feb. 20, 1998.

Guyennet et al., "A New Consistency Protocol Implemented in the CAliF System," IEEE, 1094-7256/97, pp. 82-87, 1997.

Guyennet et al., "Distributed Shared Memory Layer for Cooperative Work Applications," IEEE, 0742-1303/97, pp. 72-78, 1997.

Hamilton et al., "Subcontract: A Flexible Base for Distributed Programming," Proceedings of 14th Symposium of Operating System Principles, Dec. 1993.

Hamilton, "Java and the Shift to Net-Centric Computing," Computer, pp. 31-39, Aug. 1996.

Harris et al., "Proposal for a General Java Proxy Class for Distributed Systems and Other Uses," Netscape Communications Corp., Jun. 25, 1997.

Hartman et al., "Liquid Software: A New Paradigm for Networked Systems," Technical Report 96-11, Department of Comp. Sci., Univ. of Arizona, Jun. 1996.

Hoshi et al., "Allocation of the Cross-Connect Function in Leased Circuit Networks," 1992, ICC '92, conference record, SUPERCOMM/ICC '92, A New World of Communications, IEEE International Conference, pp. 1408-1412.

Howard et al., "Scale and Performance in a Distributed File System," ACM Transactions on Computer Systems, vol. 6, No. 1, pp. 51-81, Feb. 1988.

Hunt, "IDF: A Graphical Data Flow Programming Language for Image Processing and Computer Vision," Proceedings of the International Conference on Systems, Man, and Cybernetics, pp. 351-360, Los Angeles, Nov. 4-7, 1990.

IBM (TM) Technical Disclosure Bulletin, "Object Location Algorithm," vol. 36, No. 09B, pp. 257-258, Sep. 1993.

IBM (TM) Technical Disclosure Bulletin, "Retrieval of Qualified Variables Using Extendible Hashing," vol. 36, No. 12, pp. 301-303, Dec. 1993.

IBM Technical Disclosure Bulletin, "Local Network Monitoring to Populate Access Agent Directory," vol. 36, No. 09A, pp. 403-405, Sep. 1993.

IBM, "Chapter 6—Distributed SOM (DSOM)," SOMobjects Developer Toolkit Users Guide, Version 2.1, pp. 6-1-6-90, Oct. 1994.

"ISN Dataweb Sells Software, Hardware," Datamation, Apr. 1, 1996, p. 40.

Israel et al., "Authentication in Office System Internetworks," ACM Transactions on Office Information Systems, vol. 1, No. 3, Jul. 1983, pp. 193-210.

"Java (TM) Remote Method Invocation Specification," Sun Microsystems, Inc., <java.sun.com/products/jdk1.2beta1>, 1997.

Jaworski, "Java 1.1 Developer's Guide, 2nd Edition," Sams.net, 1997.

Jones et al., "Garbage Collection: Algorithms for Automatic Dynamic Memory Management," pp. 165-175, John Wiley & Sons, 1996.

Kambhatla et al., "Recovery with Limited Replay: Fault-Tolerant Processes in Linda," Oregon Graduate Institute, Technical Report CSIE 90-019, pp. 1-16, Sep. 1990.

Kay et al., "An Overview of the Raleigh Object-Oriented Database System," ICL Technical Journal, vol. 7, No. 4, pp. 780-798, Oxford, GB, Nov. 1991.

Keller, "Smart Catalogs and Virtual Catalogs," Proceedings of the First USENIX Workshop of Electronic Commerce, USENIX Association, Jul. 11-12, 1995, pp. 125-131.

Klein et al., "TRADE'ex: The Stock Exchange of the Computer Industry," Harvard Business School Publishing, 1996, pp. 1-14.

"Kodak DC220 and DC260 Digital Cameras Are Shipping to Retailers Across the Country Cameras Are Optimized for USB Interface Supported in Windows 98," Business Wire, Jun. 24, 1998, pp. 42-44.

"Kodak demonstrates leadership across entire photographic category," M2 Presswire, Feb. 13, 1998, pp. 31-35.

Kodak PhotoNet FAQ, PhotoNet Online, Jun. 14, 2002, pp. 1-3.

"Kodak PhotoNet Online Makes It a Snap to Share Summer Photos," PR Newswire, Jul. 2, 1998, pp. 63-64.

"Kodak Picture Network Sends Prints Home From the Holidays," Business Wire, Dec. 29, 1997, pp. 58-60.

Kolodner et al., "Atomic Garbage Collection: Managing a Stable Heap," ACM, 1989, pp. 15-25.

Kramer, "Netwatch; The AJC's Daily Online Guide; Get the picture: Kodak will send photos to Web," The Atlanta Journal and Constitution, Sec. Features, p. 08C, Jun. 5, 1997.

Krasner, "The Smalltalk-80 Virtual Machine," BYTE Publications Inc., pp. 300-320, Aug. 1991.

Lamport et al., "The Byzantine Generals Problem," ACM Transactions on Programming Languages and Systems, vol. 4, No. 3, pp. 382-401, Jul. 1982.

Lampson et al., "Authentication in Distributed Systems: Theory and Practice," ACM Transactions n Computer Systems, vol. 10, No. 4, Nov. 1992, pp. 265-310.

Lansky, "Without APS, Photo Life Goes on Via Internet," Photographic Trade News, Aug. 1996, pp. 19-23.

Lewis, "Pacific Bell, MCI to Expand Internet Service," The New York Times, sec. D, col. 1 at 3, Mar. 28, 1995.

LightSurf Instant Imaging—Press Releases, "Kodak and LightSurf Collaborate on Kodak Picture Center Online," LifeSurf Technologies Inc., Jun. 14, 2002, pp. 1-3.

LINDA Database Search, pp. 1-68, Jul. 20, 1995.

Lindholm et al., "The Java (TM) Virtual Machine Specification," Addison Wesley, 1996.

Liskov et al., "Distributed Object Management in Thor," International Workshop on Distributed Object Management, p. 12, 1992.

Louwerse et al., "Data Protection Aspects in an Integrated Hospital Information System," North-Holland Computers & Security 3, 1984, pp. 286-294.

McDaniel, "An Analysis of a Mesa Instruction Set," Xerox Corporation, May 1982.

McEnaney, "Point-and-Click Memory Sharing; Launches PhotoNet online digital photography and imaging services, "Photographic Trade News, Sec. p. 23, Jan. 1997.

McGrath, "Discovery and Its Discontents: Discovery Protocols for Ubiquitous Computing," Presented at Center for Excellence in Space Data and Information Science, NASA Goddard Space Flight Center, Apr. 5, 2000.

Miller, "Web posting as a photo processing option," USA Today, Section: Life, p. 17D, Dec. 13, 1996.

Mitchell et al., "An Overview of the Spring System," Feb. 1994.

Mitchell et al., "Mesa Language Manual," Xerox Corporation, Palo Alto Research Center, 1978.

Morris et al., "Andrew: A Distributed Personal Computing Environment," Communications of the ACM, vol. 29, No. 3, Mar. 1986, pp. 184-201.

Mullender, "Distributed Systems," Second Edition, Addison-Wesley, 1993.

Mummert et al., "Long Term Distributed File Reference Tracing: Implementation and Experience," Carnegie Mellon University School of Computer Science, pp. 1-28, Nov. 1994.

MUX-Elektronik, Java 1.1 Interactive Course, www.IIs.se/~mux/javaic.html, 1995.

O'Mahony, "Security Considerations in a Network Management Environment," IEEE Network, May/Jun. 1994, pp. 12-17.

Oppen et al., "The Clearinghouse: A Decentralized Agent for Locating Names Objects in a Distributed Environment," ACM Transactions on Office Information Systems, vol. 1, No. 3, Jul. 1983, pp. 230-253.

Orfali et al., "The Essential Distributed Objects Survival Guide," Chapter 11: Corba Commercial ORBs, pp. 203-215, John Wiley & Sons, Inc., 1996.

Osborn, "The Role of Polymorphism in Schema Evolution in an Object-Oriented Database," IEEE Transactions on Knowledge and Data Engineering, vol. 1, No. 3, Sep. 1989, pp. 310, 317.

Ousterhout et al., "The Sprite Network Operating System," Computer, IEEE, pp. 23-36, Feb. 1988.

Petersen, "New But Not Improved," Direct Magazine, Nov. 1995.

Pier, "A Retrospective on the Dorando, A High-Performance Personal Computer," IEEE Conference Proceedings, The 10th Annual International Symposium on Computer Architecture, 1983.

Pier, "A Retrospective on the Dorando, A High-Performance Personal Computer," Xerox Corp., Aug. 1983.

Pinakis, "Using Linda as the Basis of an Operating System Microkernel," University of Western Australia, Department of Computer Science, pp. 1-165, Aug. 1993.

"Photo processing made easy on the Internet; Storm Software and PictureVision team up with Konica Corp.," Business Wire, Feb. 22, 1996, pp. 3-4.

Press Release, "Sun Goes Live With the Kodak Picture Network," Sun Microsystems, Inc., Jun. 14, 2002, pp. 1-2.

Raeder, "Is there a Prodigy in your future?," Database Searcher, vol. 5, No. 6, p. 18.

Ramm et al., "Exu—A System for Secure Delegation of Authority on an Insecure Network," Ninth System Administration Conference, 1995 LISA IX, Sep. 17-22, 1995, pp. 89-93.

Riggs et al., "Pickling State in the Java (TM) System," USENIX Association Conference on Object-Oriented Technologies and Systems, XP-002112719, pp. 241-250, Jun. 17-21, 1996.

Rosenberry et al., "Understanding DCE," Chapters 1-3, 6, 1992.

Satyanarayanan, "Integrating Security in a Large Distributed System," ACM Transactions on Computer Systems, vol. 7, No. 3, Aug. 1989, pp. 247-280.

Schroeder et al., "Experience with Grapevine: The Growth of a Distributed System," ACM Transactions on Computer Systems, vol. 2, No. 1, Feb. 1984, pp. 3-23.

"Seeing your photos a whole new way," Business Wire, Dec. 12, 1996, pp. 9-10.

Senn, "Capitalizing on Electronic Commerce: The Role of the Internet in Electronic Markets," Information Systems Management, Summer 1996, pp. 15-24.

Sharrott et al., "ObjectMap: Integrating High Performance Resources into a Distributed Object-oriented Environment," ICODP, 1995.

Steinke, "Design Aspects of Access Control in a Knowledge Base System," Computers & Security, 10, 1991, pp. 612-625.

Stern, "Industry Net," Link-Up, Mar./Apr. 1995, p. 10.

Stevenson, "Token-Based Consistency of Replicated Servers," IEEE, CH2686-4/89/0000/0179, pp. 179-183, 1989.

Tanenbaum et al., "Distributed Operating Systems," Computing Surveys, vol. 17, No. 4, Dec. 1985, pp. 419-470.

The Wall Street Journal, "Barclays Is Opening an 'Electronic Mall' for Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Thompson, "Regular Expression Search Algorithm," Communications of the ACM, vol. II, No. 6, p. 149 et seq., Jun. 1968.

"Transparent Network Computing," Locus Computing Corporation, Jan. 5, 1995.

Trommer, "Thomas Unveils Online Purchasing Network—Eases Product Sourcing and Ordering Through EDI," Electronic Buyers' News at 60, Dec. 11, 1995.

Van Den Berg et al., "Advanced Topics of a Computer Center Audit," North-Holland Computers & Security 3, 1984, pp. 171-185.

Van Der Lans, "Data Security in a Relational Database Environment," North-Holland Computers & Security 5, 1986, pp. 128-134.

Venners, "Jini Technology, Out of the Box," Javaworld, 'Online!, pp. 1-4, Dec. 1998.

Waldo et al., "Events in an RPC Based Distributed System," Proceedings of the 1995 USENIX Technical Conference, Proceedings USENIX Winter 1995 Technical Conference, New Orleans, LA, USA, 16-20, pp. 131-142, Jan. 1995.

Welz, "New Deals: A ripening Internet market, secure systems and digital currency are reshaping global commerce," Internet World, Jun. 1995, pp. 36-41.

"Webwatch: MCI Announces Internet Access," Boardwatch Magazine, Jan. 1995.

Wilson et al., "Design of the Opportunistic Garbage Collector," Proceedings of the Object Oriented Programming Systems Languages and Applications Conference, New Orleans, vol. 24, No. 10, Oct. 1989.

Wobber et al., "Authentication in the Taos Operating System," ACM, 1993, pp. 256-269.

Wollrath et al., "A Distributed Object Model for the Java (TM) System," USENIX Association, Conference on Object-Oriented Technologies and Systems, Jun. 17-21, 1996.

Wu, "A Type System for an Object-Oriented Database System," Proceedings of the International Computer Software and Applications Conference (COMPSAC), Tokyo, Japan, pp. 333-338, Sep. 11-13, 1991.

Wyatt, "Netscape Enterprise Server," Prima Publishing, 1996.

Yemini et al., "Towards Programmable Networks," IFIP/IEEE International Workshop on Distributed Systems: Operations and Management, L'Aquila, Italy, Oct. 1996.

Yin et al., "Using Leases to Support Server Driven Consistency in Large-Scale Systems," Computer Services Department, University of Texas at Austin, p. 285-294, May 26-28, 1998.

Yin et al., "Volume Leases for Consistency in Large-Scale Systems," IEEE Transactions on Knowledge & Data Engineering, vol. 11, No. 4, pp. 563-576, Jul./Aug. 1999.

Jennings, N.R. et al., "Using Intelligent Agents to Manage Business Processes," Dept. Electronic Engineering, Queen Mary & Westfield College, Mile End Road, London, E1 4NS, U.K., XP-002254546, 1996 (pp. 345-360).

Auto-ID Center, "Auto-ID Savant Specification 1.0," Version of Oct. 13, 2003 (58 pages).

Almes, Guy T. et al., "The Evolution of the Eden Invocation Mechanism", Department of Computer Science, University of Washington, Technical Report 83-01-03, pp. 1-14 & abstract, Jan. 19, 1983.

Almes, Guy T. et al., "Edmas: A Locally Distributed Mail System", Department of Computer Science, University of Washington, Technical Report 83-07-01, abstract and pp. 1-17, Jul. 7, 1983.

Almes, Guy T. et al., "Integration and Distribution in the Eden System", Department of Computer Science, University of Washington, Technical Report 83-01-02, pp. 1-18 & abstract, Jan. 19, 1983.

Almes, Guy T. et al., "Research in Integrated Distributed Computing", Department of Computer Science, University of Washington, pp. 1-42, Oct. 1979.

Almes, Guy T. et al., "The Eden System: A Technical Review", Department of Computer Science, University of Washington, Technical Report 83-10-05, pp. 1-25, Oct. 1983.

Arnold, Ken et al. "The Jini Distributed Event Specification", The Jini Specification, pp. 155-182, Jul. 1999.

Arnold, Ken et al. "The Jini Lookup Service Specification", The Jini Specification, pp. 217-232, Jul. 1999.

Arnold, Ken, "The Jini Architecture: Dynamic Services in a Flexible Network", Sun Microsystems, Inc., Proceedings of the 36th ACM IEEE Design Automation Conference, pp. 157-162, Jun. 1999.

Begole, James et al., "Transparent Sharing of Java Applets: A Replicated Approach", pp. 55-65, Oct. 1997.

Black, Andrew et al., "A Language for Distributed Programming", Department of Computer Science, University of Washington, Technical Report 86-02-03, p. 10, Feb. 1986.

Black, Andrew et al., "Distribution and Abstract Types in Emerald", University of Washington, Technical Report 85-08-05, pp. 1-10, Aug. 1985.

Black, Andrew et al., "Object Structure in the Emerald System", University of Washington, Technical Report 86-04-03, pp. 1-14, Apr. 1986.

Black, Andrew et al., "The Eden Project: A Final Report", Department of Computer Science, University of Washington, Technical Report 86-11-01, pp. 1-28, Nov. 1986.

Black, Andrew, "Supporting Distributed Applications: Experience with Eden", Department of Computer Science, University of Washington, Technical Report 85-03-02, pp. 1-21, Mar. 1985.

Black, Andrew, "The Eden Programming Language", Department of Computer Science, FR-35, University of Washington, Technical Report 85-09-01, pp. 1-19, Sep. 1985, (Revised Dec. 1985).

Black, Andrew, "The Eden Project: Overview and Experiences", Department of Computer Science, University of Washington, EUUG, Autumn '86 Conference Proceedings, Manchester, UK, pp. 177-189, Sep. 22-25, 1986.

Braine, Lee et al., "Object Flow", Proceedings of the 1997 IEEE Symposium on Visual Languages (VL '97), pp, 418-419, 1997.

Chan, P. et al., *The Java Class Libraries, 2nd Edition*, vol. 1, "Java.io ObjectInputStream," XP-002243027, pp. 1230-1232, 1262-1264, and 1283, Mar. 9, 1998 (7 pages).

Ciancarini, Paolo et al, "Coordinating Distributed Applets with Shade/Java", Proceedings of the 1998 ACM Symposium on Applied Computing, pp. 130-138, Feb. 1998.

Dave, Amitabh et al., "Proxies, Application Interfaces, and Distributed Systems", IEEE, Proceedings of the Second International Workshop on Object Orientation in Operating Systems, pp. 212-220, Sep. 24-25, 1992.

Delcambre, L. et al., "Simulation of the Object Flow Model: A Conceptual Modeling Language for Object-Driven Applications", Proceedings of the 26th Annual Simulation Symposium, pp. 216-225, Mar. 29, 1993.

"Eden Project Proposal", Department of Computer Science, University of Washington, Technical Report #80-10-01, cover and forward, Oct. 1980.

Goldberg, Adele et al., *Smalltalk-80—The Language and its Implementation*, Xerox Palo Alto Research Center, pp. 1-720, 1983 (reprinted with corrections, Jul. 1985).

Hodges, Douglas, "Managing Object Lifetimes in OLE", pp. 1-41, Aug. 25, 1994.

Holman, C. et al., "The Eden Shared Calendaring System", Department of Computer Science, FR-35, University of Washington, Technical Report 85-05-02, pp. 1-14, Jun. 22, 1985.

Hsu, Meichun "Reimplementing Remote Procedure Calls", University of Washington, Thesis, pp. 1-106, Mar. 22, 1985.

Hutchinson, Norman C., "Emerald: An Object-Based Language for Distributed Programming", a Dissertation, University of Washington, pp. 1-107, 1987.

Jacob, Bruce L., "The Use of Distributed Objects and Dynamic Interfaces in a Wide-Area Transaction Environment", SIGCOMMn '95 Workshop on Middleware: Cambridge, Mass, Aug. 1995, pp. 1-3.

Jul, "Object Mobility in a Distributed Object-Oriented System", a Dissertation, University of Washington, pp. 1-154, 1989, (1 page Vita).

Jul, Eric et al., "Fine-Grained Mobility in the Emerald System", University of Washington, ACM Transactions on Computer Systems, 6(1):109-133, Feb. 1988.

Koshizuka, Noboru et al., "Window Real-Objects: A Distributed Shared Memory for Distributed Implementation of GUI Applications", pp. 237-247, Nov. 1993.

Kougiouris et al., "Support for Space Efficient Object Invocation in Spring", Sep. 1994.

Lavana et al., Executable Workflows: A Paradigm for Collective Design on the Internet, Jun. 1997, 6 pages.

Li et al., *Professional Jini*, Ch. 7, Aug. 2000.

Opytrchal, L. et al., "Efficient Object Serialization in Java", Department of Electrical Engineering and Computer Science, University of Michigan, XP-002242373, May 31, 1999. (6 pages).

Proceedings of the Eighth Symposium on Operating Systems Principles, Dec. 14-16, 1981, ACM, Special Interest Group on operating Systems, Association for Computing Machinery, vol. 15, No. 5, Dec. 1981, ACM Order No. 534810.

Proudfoot, Andrew, "Replects: Data Replication in the Eden System", Department of Computer Science, University of Washington, Technical Report 85-12-04, pp. 1-156, Dec. 1985.

Pu, "Replication and nested Transaction in Eden Distributed System", Doctoral Dissertation, University of Washington, pp. 1-179, Aug. 6, 1986, (1 page Vita).

Smith, H.A. et al., "Object-Oriented Technology: Getting Beyond the Hype", ACM, 27(2):20-29, Spring 1996.

Spiteri, M.D. et al., "An Architecture to support storage and retrieval of events", Proceedings of Middleware 1998, IFIP International Conference on Distributed Systems Platforms and Open Distributed Processing, Lancaster, UK, Sep. 1998.

Sun Microsystems, "Java Remote Method Invocation Specification," JDK 1.1 FCS, Sun Microsystems, Inc., Ch. 4-5, Feb. 1997.

Sun Microsystems, "Java™ Object Serialization Specification," Sun Microsystems, Inc., XP-002242327, Nov. 30, 1998. (76 pages) www.dei.estg.iplei/pt/P3/N/material/extra/serial-spec-JDK1_2.pdf.

Trehan, Rajiv et al., "Toolkit for Shared Hypermedia on a Distributed Object Oriented Architecture", Proceedings of the first ACM international conference on Multimedia, pp. 1-8, Anaheim, CA, Aug. 2-3, 1993.

Wolrath, Ann et al., "JAVA-Centric Distributed Computing", *IEEE Micro*, 17(3): 44-53, Jun. 1997.

\* cited by examiner

FIG.16

```
<QosRequirements>
    <ResourceType>com.sun.rio.qos.Server</ResourceType>
    <PlatformCriteria>
        <PlatformCapability
            Class="com.sun.rio.qos.platform.system.ProcessorArchitecture">
            <Attribute Name="Architecture" Value="SPARC"/>
            <Attribute Name="NumberOfProcessors" Value="2"/>
        </PlatformCapability>
    </PlatformCriteria>
    <MeasurableCriteria>
        <ComputeResource Cost=".7" />
        <MeasurableCapability
            Class="com.sun.rio.qos.measurable.CPU" High=".8"/>
        <MeasurableCapability
            Class="com.sun.rio.qos.measurable.Memory" High=".6"/>
    </MeasurableCriteria>
</QosRequirements>
```

SYSTEMS AND METHODS FOR PROVIDING DYNAMIC QUALITY OF SERVICE FOR A DISTRIBUTED SYSTEM

RELATED APPLICATIONS

This application claims the benefit of U.S. Provisional Patent Application No. 60/378,957, filed May 10, 2002, the disclosure of which is expressly incorporated herein by reference in its entirety. Further, this application is a continuation-in-part of U.S. patent application Ser. No. 09/947,528, filed Sep. 7, 2001, now abandoned, the disclosure of which is also incorporated herein by reference in its entirety.

FIELD OF THE INVENTION

This invention relates to providing services in a distributed system and, more particularly, to methods and systems for dynamically provisioning quality of service for a distributed system.

BACKGROUND OF THE INVENTION

Distributed systems today enable a device connected to a communications network to take advantage of services available on other devices located throughout the network. Each device in a distributed system may have its own internal data types, its own address alignment rules, and its own operating system. To enable such heterogeneous devices to communicate and interact successfully, developers of distributed systems can employ a remote procedure call (RPC) communication mechanism.

RPC mechanisms provide communication between processes (e.g., programs, applets, etc.) running on the same device or different devices. In a simple case, one process, i.e., a client, sends a message to another process, i.e., a server. The server processes the message and, in some cases, returns a response to the client. In many systems, the client and server do not have to be synchronized. That is, the client may transmit the message and then begin a new activity, or the server may buffer the incoming message until the server is ready to process the message.

The Java™ programming language is an object-oriented programming language that may be used to implement such a distributed system. The Java™ language is compiled into a platform-independent format, using a bytecode instruction set, which can be executed on any platform supporting the Java™ virtual machine (JVM). The JVM may be implemented on any type of platform, greatly increasing the ease with which heterogeneous machines can be federated into a distributed system.

The Jini™ architecture has been developed using the Java™ programming language to enable devices in a distributed to share services using remote method invocation (RMI). Traditional Jini™ systems use RMI to enable a client device to request and receive a service provided by a server device on a remote machine. While conventional Jini™ systems provide a basic architecture for providing services in a distributed system, they do not provide tools specifically directed to providing complex services. Current systems do not address provisioning a service, such as application software, to make it available to the distributed system in the first place. Furthermore, conventional systems do not consider the quality of service requirements of a specific service before provisioning the service to make it available in the distributed system.

SUMMARY OF THE INVENTION

Methods and systems consistent with certain aspects related to the present invention provide a dynamic service delivery system based on a capability to provide services through a distributed system using qualitative and quantitative Quality of Service (QoS) attributes.

In one aspect of the invention, a method for providing a service that includes collecting capability information reflecting a current operating condition of a compute resource and determining a measurable capability value for a depletion-oriented characteristic of the compute resource based on the collected capability information. Further, a platform capability for the compute resource may also be determined. Based on at least one of the platform capability and the measurable capability value; a capability value for the compute resource is determined. This value is provided to a provision manager that determines whether the compute resource is worthy of being an available resource in the distributed system based on the capability value.

In another aspect of the invention, a method is provided for provisioning a service that includes collecting a resource capability object from a compute resource, determining whether the compute resource meets a QoS capability threshold based on the resource capability object, and registering the compute resource as an available resource in the distributed system based on the determination.

In yet another aspect of the invention, a method is provided for provisioning a service in a distributed system including a cybernode running on a compute resource that provides the service. In this aspect of the invention, the method may include monitoring a depletion-oriented characteristic of the compute resource and determining that a QoS capability of the compute resource does not meet a corresponding QoS threshold. A threshold event may be provided to an SLA manager that includes an indication of the QoS capability based on the determination. An action may also be performed based on the threshold event.

Additional features of the invention will be set forth in part in the description which follows, and in part will be obvious from the description, or may be learned by practice of the invention.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

FIG. 16 shows an exemplary service QoS definition consistent with certain aspects related to the present invention;

DETAILED DESCRIPTION

The following description of embodiments of this invention refers to the accompanying drawings. Where appropriate, the same reference numbers in different drawings refer to the same or similar elements.

Introduction

Systems consistent with the present invention enable a distributed system to measure the suitability of each of a plurality of heterogeneous resources to provision a service based on quantifiable and qualitative attributes of the respective resources. A service may be associated with a complex service that is provisioned over a distributed network. A complex service may be broken down into a collection of simpler services. For example, automobiles today incorporate complex computer systems to provide in-vehicle navigation, entertainment, and diagnostics. These systems are usually federated into a distributed system that may include wireless connections to a satellite, the Internet, etc. Any one of an automobile's systems can be viewed as a complex service that can in turn be viewed as a collection of simpler services.

A car's overall diagnostic system, for example, may be broken down into diagnostic monitoring of fluids, such as oil pressure and brake fluid, and diagnostic monitoring of the electrical system, such as lights and fuses. The diagnostic monitoring of fluids could then be further divided into a process that monitors oil pressure, another process that monitors brake fluid, etc. Furthermore, additional diagnostic areas, such as drive train or engine, may be added over the life of the car.

Systems consistent with the present invention provide the tools to deconstruct a complex service into service elements, provision service elements that are needed to make up the complex service, and monitor the service elements to ensure that the complex service is supported. One embodiment of the present invention can be implemented using the Rio architecture created by Sun Microsystems and described in greater detail below. Rio uses tools provided by the Jini™ architecture, such as discovery and event handling, to provision and monitor complex services in a distributed system.

Figure 1:
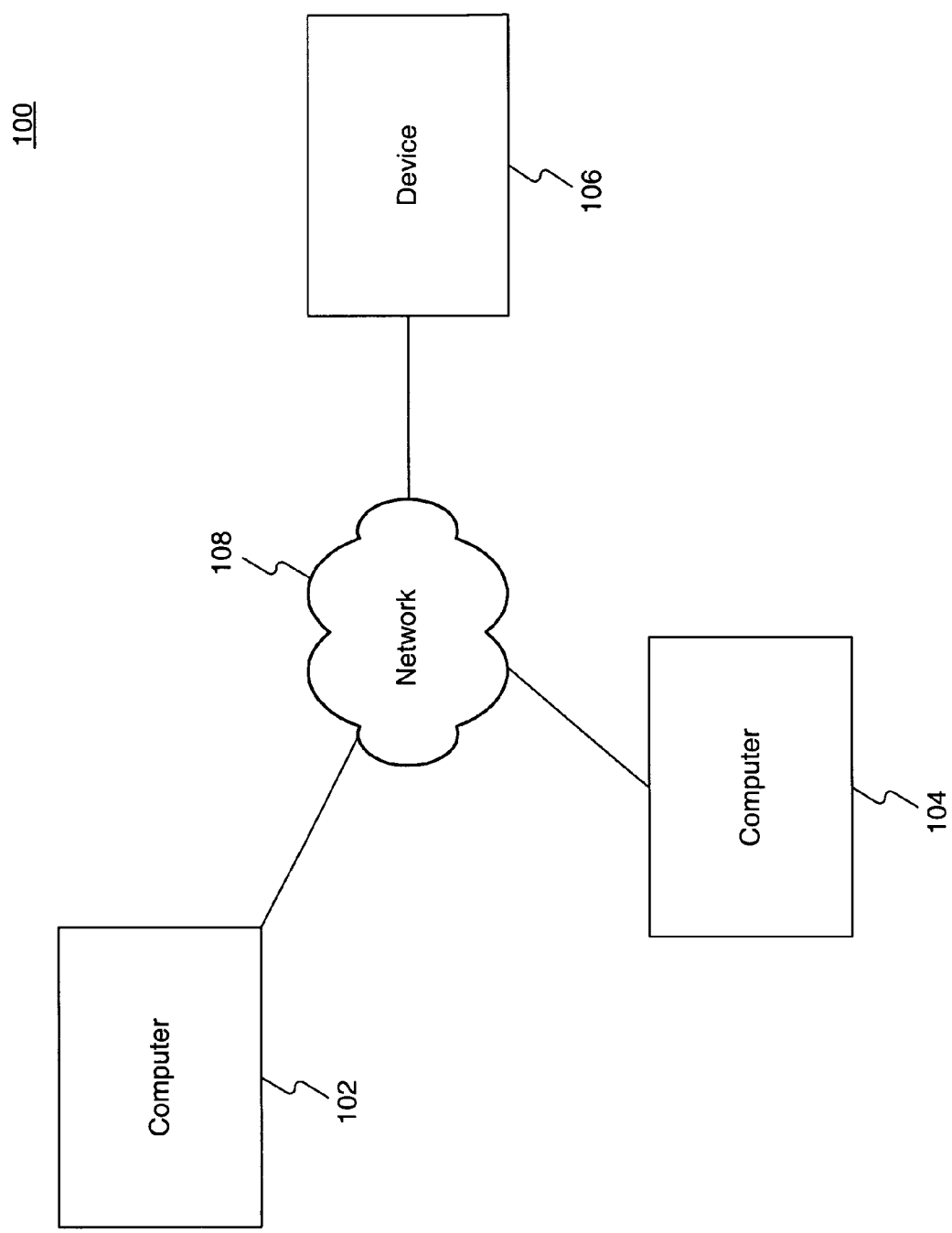
FIG. 1 is a high level block diagram of an exemplary system for practicing systems and methods consistent with the present invention.

FIG. 1 is a high level block diagram of an exemplary distributed system consistent with the present invention. FIG. 1 depicts a distributed system 100 that includes computers 102 and 104 and a device 106 communicating via a network 108. Computers 102 and 104 can use any type of computing platform. Device 106 may be any of a number of devices, such as a printer, fax machine, storage device, or computer. Network 108 may be, for example, a local area network, wide area network, or the Internet. Although only two computers and one device are depicted in distributed system 100, one skilled in the art will appreciate that distributed system 100 may include additional computers and/or devices.

The computers and devices of distributed system 100 provide services to one another. A "service" is a resource, data, or functionality that can be accessed by a user, program, device, or another service. Typical services include devices, such as printers, displays, and disks; software, such as programs or utilities; and information managers, such as databases and file systems. These services may appear programmatically as objects of the Java™ programming environment and may include other objects, software components written in different programming languages, or hardware devices. As such, a service typically has an interface defining the operations that can be requested of that service.

Figure 2:
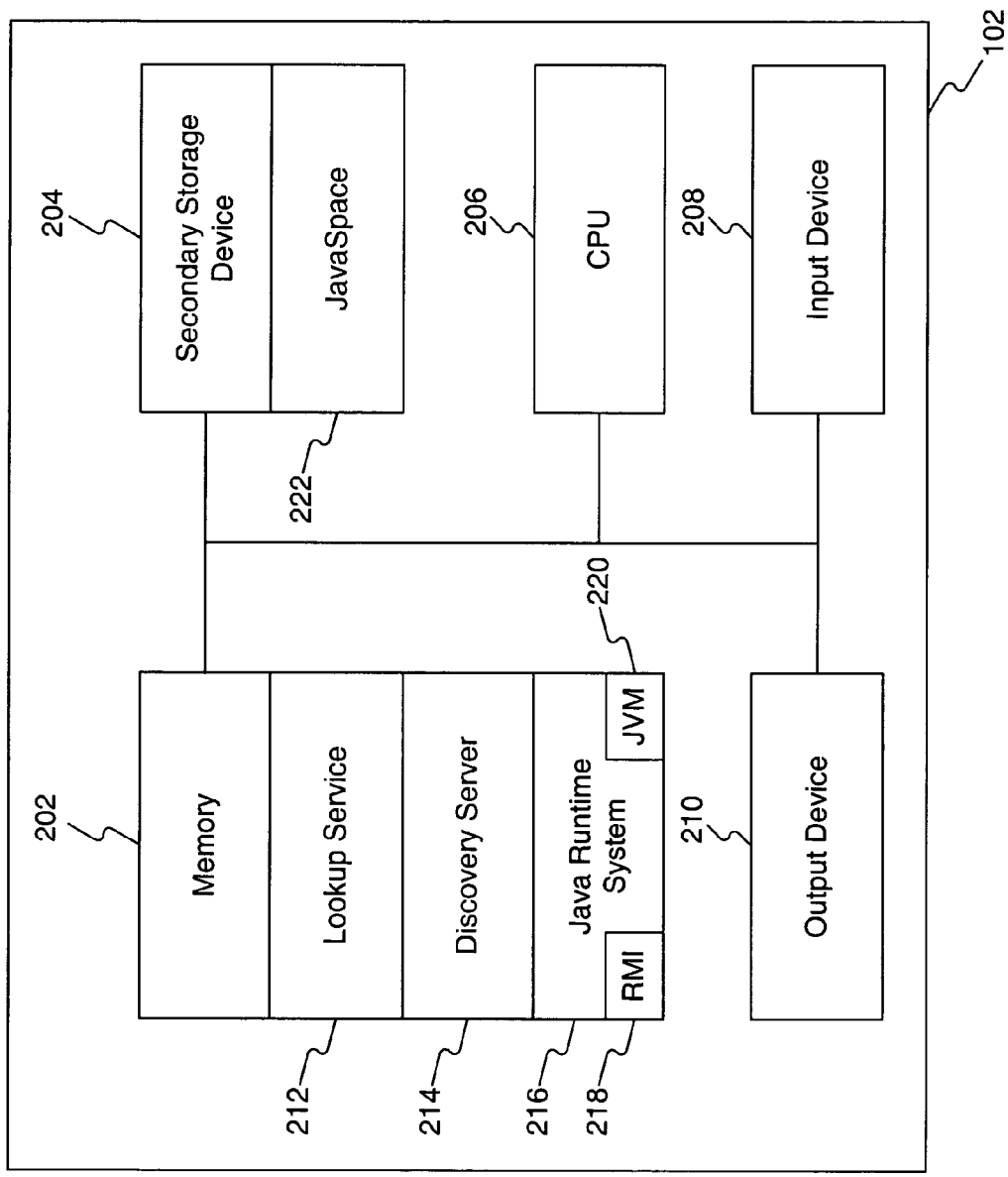
FIG. 2 depicts a computer in greater detail to show a number of the software components of an exemplary distributed system consistent with the present invention.

FIG. 2 depicts computer 102 in greater detail to show a number of the software components of distributed system 100. One skilled in the art will recognize that computer 104 and device 106 could be similarly configured. Computer 102 contains a memory 202, a secondary storage device 204, a central processing unit (CPU) 206, an input device 208, and output device 210. Memory 202 includes a lookup service 212, a discovery server 214, and a Java™ runtime system 216. Java™ runtime system 216 includes Remote Method Invocation (RMI) process 218 and Java™ virtual machine (JVM) 220. Secondary storage device 204 includes a Java™ space 222.

Memory 202 can be, for example, a random access memory. Secondary storage device 204 can be, for example, a CD-ROM. CPU 206 can support any platform compatible with JVM 220. Input device 208 can be, for example, a keyboard or mouse. Output device 210 can be, for example, a printer.

JVM 220 acts like an abstract computing machine, receiving instructions from programs in the form of bytecodes and interpreting these bytecodes by dynamically converting them into a form for execution, such as object code, and executing them. RMI 218 facilitates remote method invocation by allowing objects executing on one computer or device to invoke methods of an object on another computer or device. Lookup Service 212 and Discovery Server 214 are described in great detail below. Java™ space 222 is an object repository used by programs within distributed system 100 to store objects. Programs use Java space 222 to store objects persistently as well as to make them accessible to other devices within distributed system 100.

The Jini™ Environment

The Jini™ environment enables users to build and maintain a network of services running on computers and devices.

Jini™ is an architectural framework provided by Sun Microsystems that provides an infrastructure for creating a flexible distributed system. In particular, the Jini™ architecture enables users to build and maintain a network of services on computers and/or devices. The Jini™ architecture includes Lookup Service 212 and Discovery Server 214 that enable services on the network to find other services and establish communications directly with those services.

Lookup Service 212 defines the services that are available in distributed system 100. Lookup Service 212 contains one object for each service within the system, and each object contains various methods that facilitate access to the corresponding service. Discovery Server 214 detects when a new device is added to distributed system 100 during a process known as boot and join, or discovery. When a new device is detected, Discovery Server 214 passes a reference to the new device to Lookup Service 212. The new device may then register its services with Lookup Service 212, making the device's services available to others in distributed system 100. One skilled in the art will appreciate that exemplary distributed system 100 may contain many Lookup Services and Discovery Servers.

Figure 3:
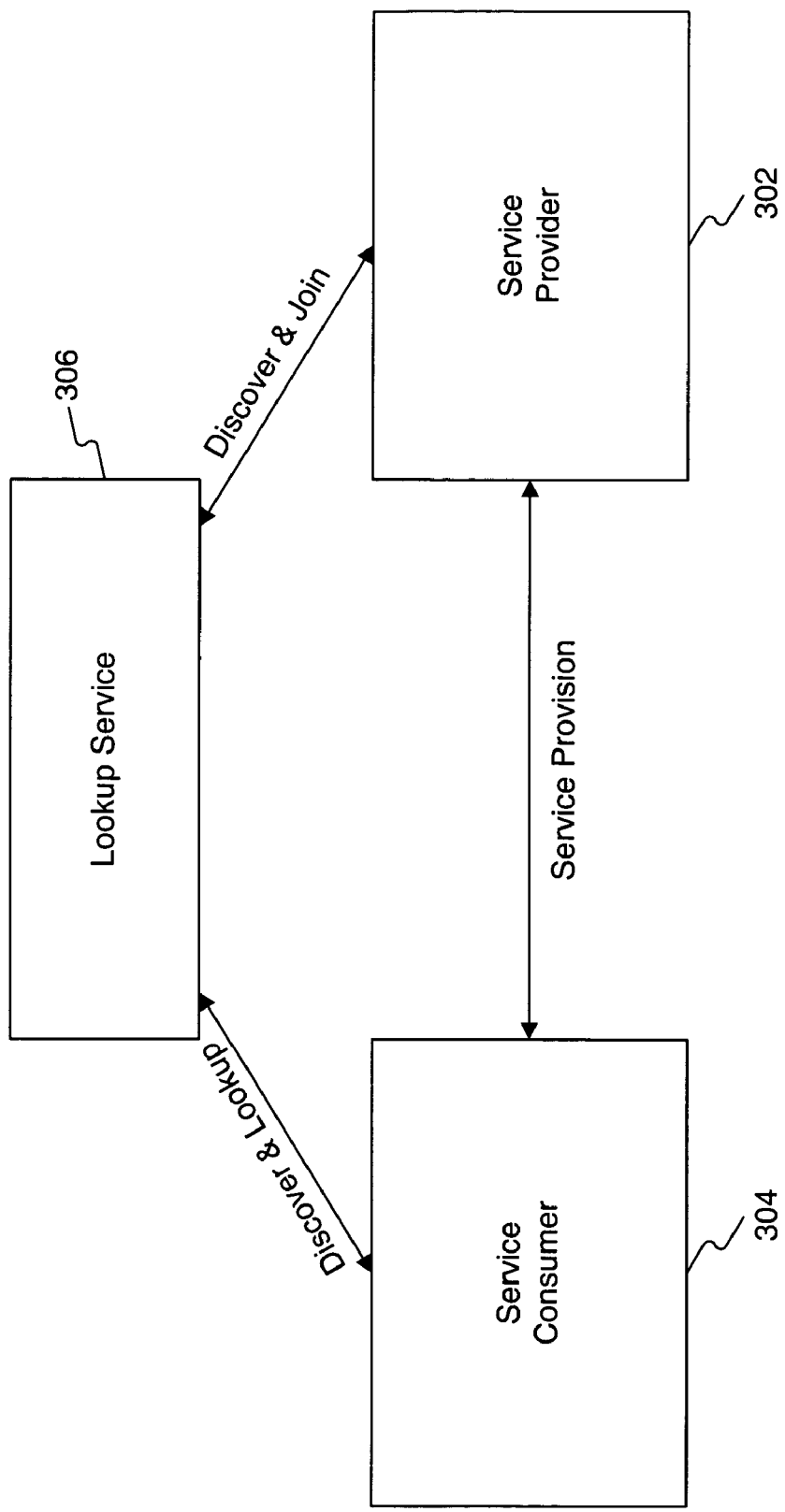
FIG. 3 depicts an embodiment of the discovery process in more detail, in accordance with the present invention.

FIG. 3 depicts an embodiment of the discovery process in more detail. This process involves a service provider 302, a service consumer 304, and a lookup service 306. One skilled in the art will recognize that service provider 302, service consumer 304, and lookup service 306 may be objects running on computer 102, computer 104, or device 106.

As described above, service provider 302 discovers and joins lookup service 306, making the services provided by service provider 302 available to other computers and devices in the distributed system. When service consumer 304 requires a service, it discovers lookup service 306 and sends a lookup request specifying the needed service to lookup service 306. In response, lookup service 306 returns a proxy that corresponds to service provider 302 to service consumer 304. The proxy enables service consumer 304 to establish contact directly with service provider 302. Service provider 302 is then able to provide the service to service consumer 304 as needed. An implementation of the lookup service is explained in "The Jini™ Lookup Service Specification," contained in Arnold et al., *The Jini™ Specification*, Addison-Wesley, 1999, pp. 217-231.

Distributed systems that use the Jini™ architecture often communicate via an event handling process that allows an object running on one Java™ virtual machine (i.e., an event consumer or event listener) to register interest in an event that occurs in an object running on another Java™ virtual machine (i.e., an event generator or event producer). An event can be, for example, a change in the state of the event producer. When the event occurs, the event consumer is notified. This notification can be provided by, for example, the event producer.

Figure 4:
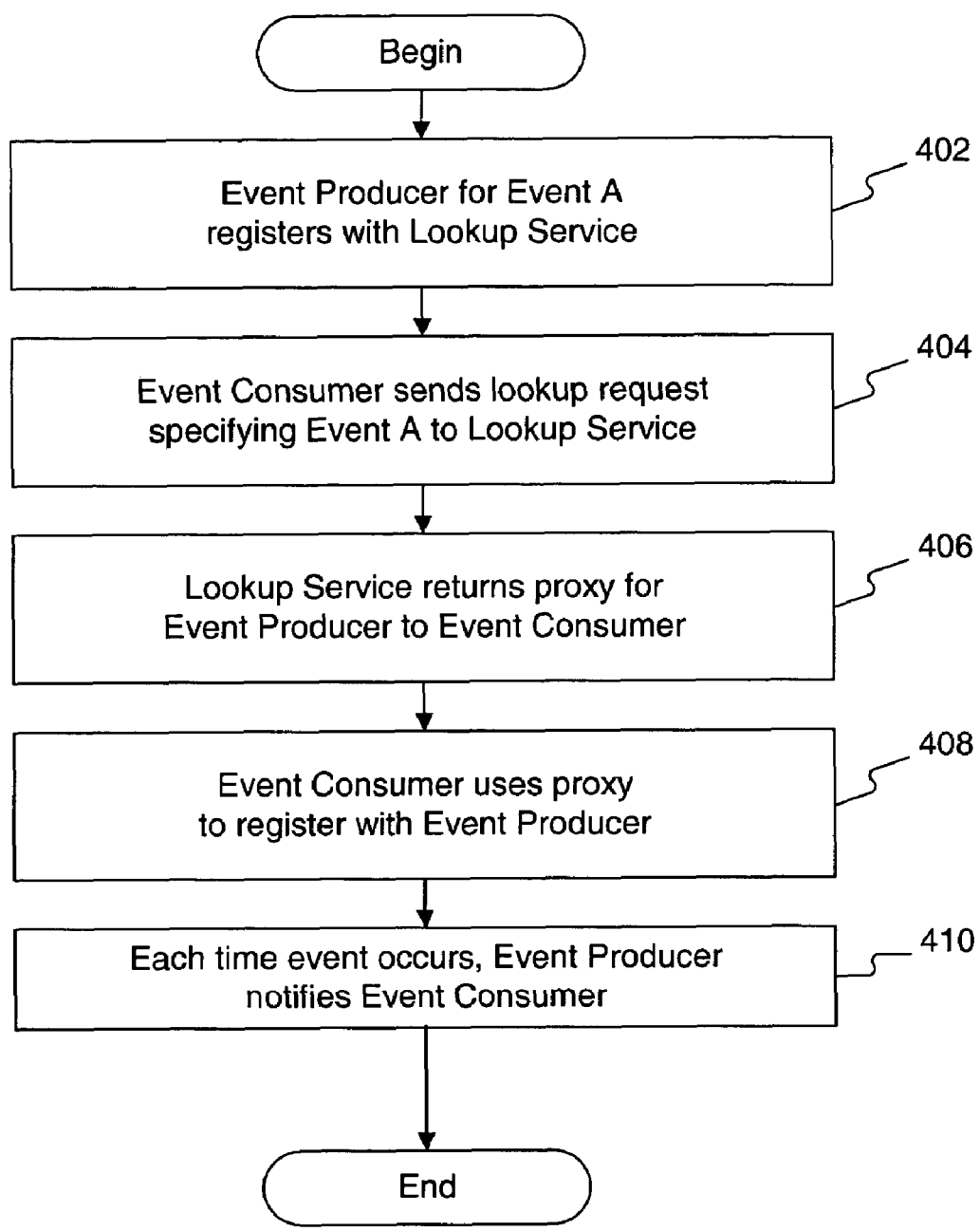
FIG. 4 is a flow chart of an embodiment of the event handling process, in accordance with the present invention.

FIG. 4 is a flow chart of one embodiment of the event handling process. An event producer that produces event A registers with a lookup service (step 402). When an event consumer sends a lookup request specifying event A to the lookup service (step 404), the lookup service returns a proxy for the event producer for event A to the event consumer (step 406). The event consumer uses the proxy to register with the event producer (step 408). Each time the event occurs thereafter, the event producer notifies the event consumer (step 410). An implementation of Jini™ event handling is explained in "The Jini™ Distributed Event Specification," contained in Arnold et al., *The Jini™ Specification*, Addison-Wesley, 1999, pp. 155-182.

Overview of Rio Architecture

The Rio architecture enhances the basic Jini™ architecture to provision and monitor complex services by considering a complex service as a collection of service elements. To provide the complex service, the Rio architecture instantiates and monitors a service instance corresponding to each service element. A service element might correspond to, for example, an application service or an infrastructure service. In general, an application service is developed to solve a specific application problem, such as word processing or spreadsheet management. An infrastructure service, such as the Jini™ lookup service, provides the building blocks on which application services can be used. One implementation of the Jini lookup service is described in U.S. Pat. No. 6,185,611, for "Dynamic Lookup Service in a Distributed System."

Figure 5:
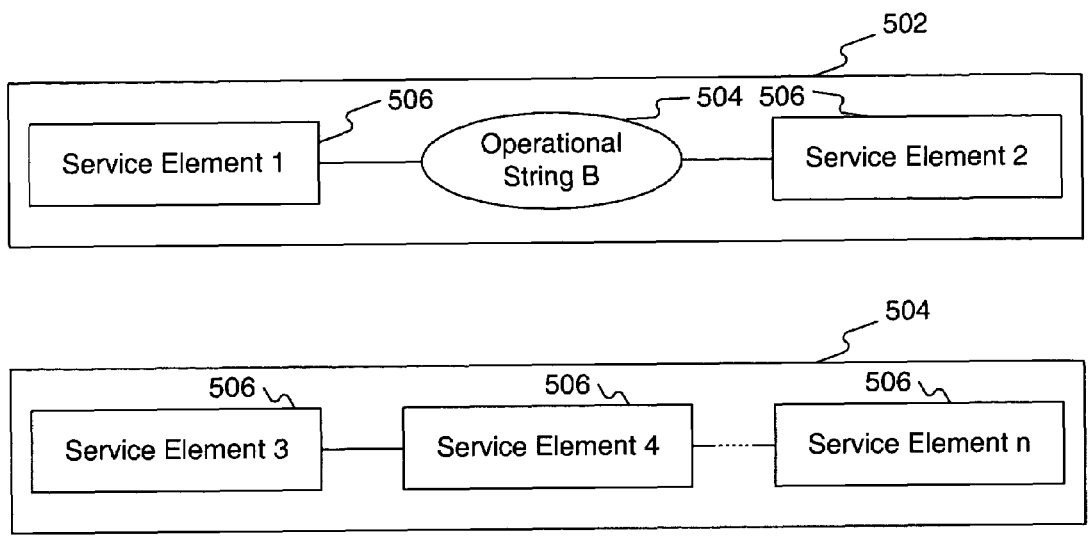
FIG. 5 is a block diagram of an exemplary operational string, in accordance with the present invention.

Consistent with the present invention, a complex service can be represented by an operational string. FIG. 5 depicts a exemplary operational string 502 that includes one or more service elements 506 and another operational string 504. Operational string 504 in turn includes additional service elements 506. For example, operational string 502 might represent the diagnostic monitoring of an automobile. Service element 1 might be diagnostic monitoring of the car's electrical system and service element 2 might be diagnostic monitoring of the car's fluids. Operational string B might be a process to coordinate alerts when one of the monitored systems has a problem. Service element 3 might then be a user interface available to the driver, service element 4 might be a database storing thresholds at which alerts are issued, etc. In an embodiment of the present invention, an operation string can be expressed as an XML document. It will be clear to one of skill in the art that an operational string can contain any number of service elements and operational strings.

Figure 6:
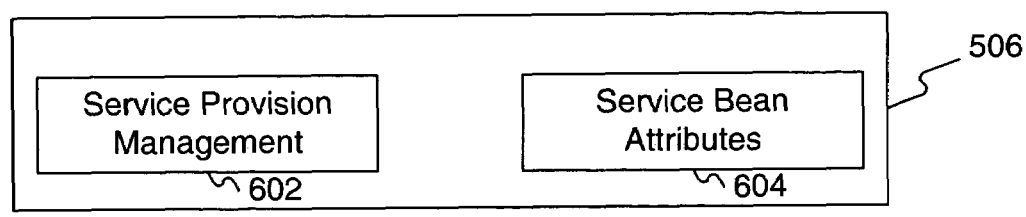
FIG. 6 is a block diagram of an exemplary service element, in accordance with the present invention.

FIG. 6 is a block diagram of a service element in greater detail. A service element contains instructions for creating a corresponding service instance. In one implementation consistent with the present invention, service element 506 includes a service provision management object 602 and a service bean attributes object 604. Service provision management object 602 contains instructions for provisioning and monitoring the service that corresponds to service element 506. For example, if the service is a software application, these instructions may include the requirements of the software application, such as hardware requirements, response time, throughput, etc. Service bean attributes object 604 contains instructions for creating an instance of the service corresponding to service element 506. In one implementation consistent with the present invention, a service instance is referred to as a Jini™ Service Bean (JSB).

Jini™ Service Beans

A Jini™ Service Bean (JSB) is a Java TM object that provides a service in a distributed system. As such, a JSB implements one or more remote methods that together constitute the service provided by the JSB. A JSB is defined by an interface that declares each of the JSB's remote methods using Jini™ Remote Method Invocation (RMI) conventions. In addition to its remote methods, a JSB may include a proxy and a user interface consistent with the Jini™ architecture.

Figure 7:
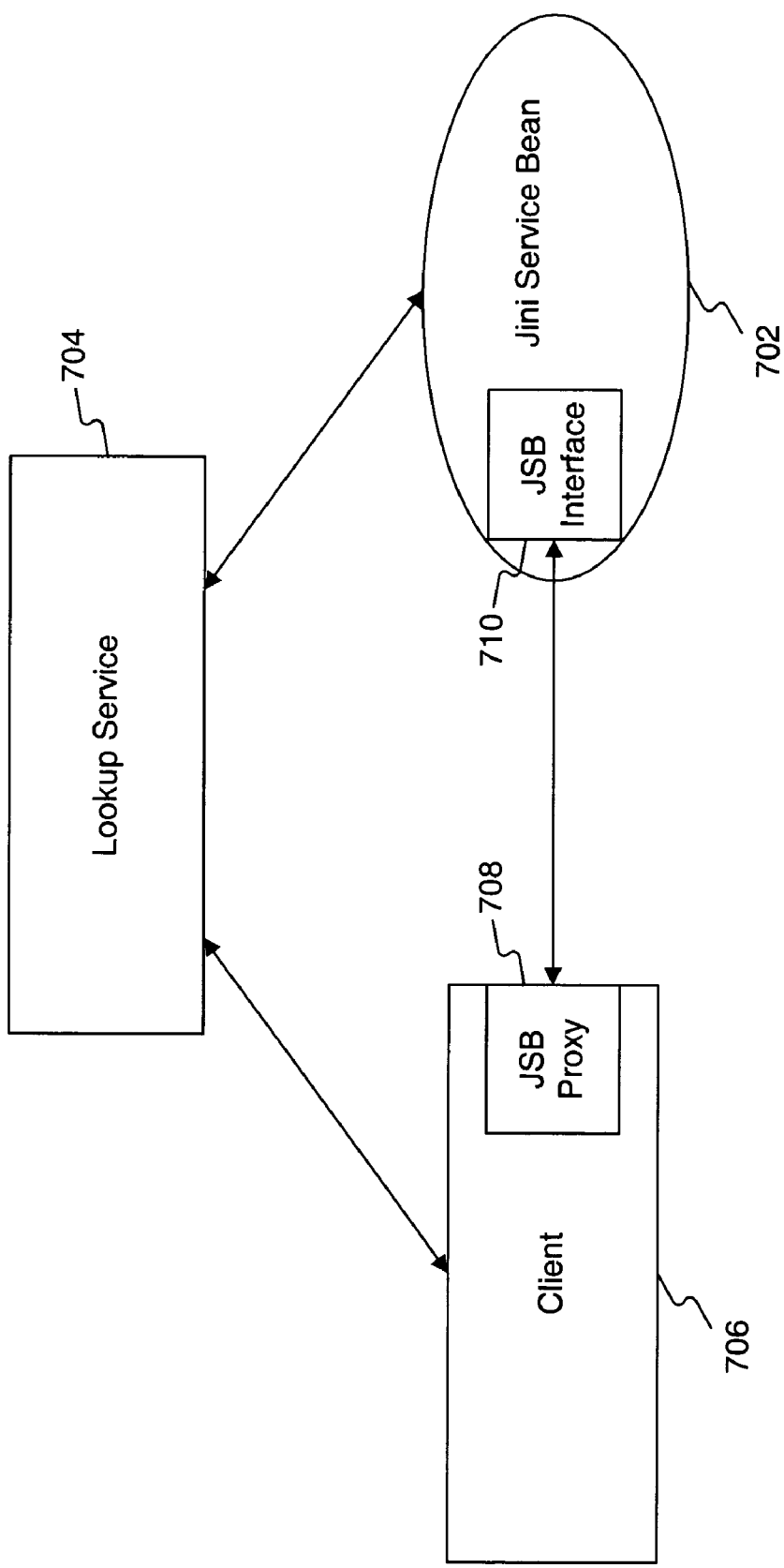
FIG. 7 depicts a block diagram of a system in which a Jini Service Bean (JSB) provides its service to a client, in accordance with the present invention.

FIG. 7 depicts a block diagram of a system in which a JSB provides its service to a client. This system includes a JSB 702, a lookup service 704, and a client 706. When JSB 702 is created, it registers with lookup service 704 to make its service available to others in the distributed system. When a client 706 needs the service provided by JSB 702, client 706 sends a lookup request to lookup service 702 and receives in response a proxy 708 corresponding to JSB 706. Consistent with an implementation of the present invention, a proxy is a Java™ object, and its types (i.e., its interfaces and superclasses) represent its corresponding service. For example, a proxy object for a printer would implement a printer interface. Client 706 then uses JSB proxy 708 to communicate directly with JSB 702 via a JSB interface 710. This communication enables client 706 to obtain the service provided by JSB 702. Client 706 may be, for example, a process running on computer 102, and JSB 702 may be, for example, a process running on device 106.

Cybernode Processing

A JSB is created and receives fundamental life-cycle support from an infrastructure service called a "cybernode." A cybernode runs on a compute resource, such as a computer or device and represents the capabilities of the compute resource that has instantiated the cybernode. In one embodiment of the present invention, a cybernode runs as a Java™ virtual machine, such as JVM 220, on a computer, such as computer 102. Consistent with the present invention, a compute resource may run any number of cybernodes at a time and a cybernode may support any number of JSBs.

Figure 8:
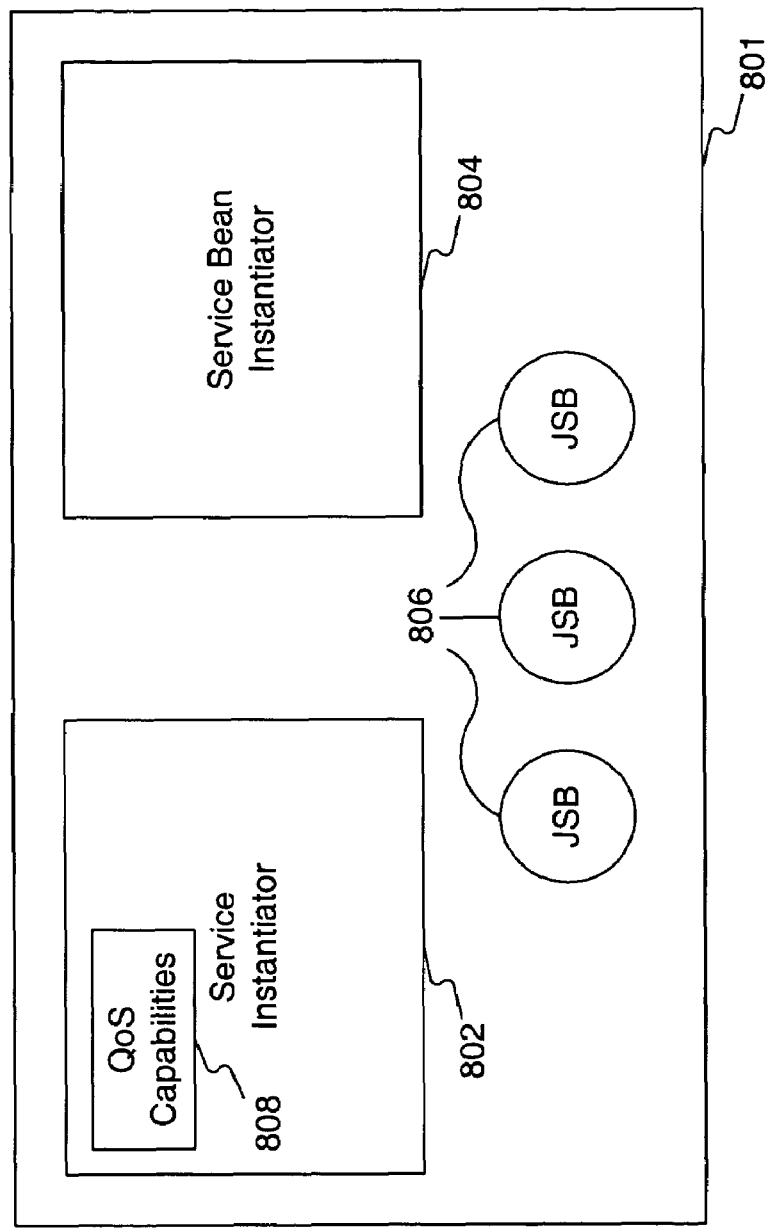
FIG. 8 depicts a block diagram of a cybernode in accordance with the present invention.

FIG. 8 depicts a block diagram of a cybernode. Cybernode 801 includes service instantiator 802 and service bean instantiator 804. Cybernode 801 may also include one or more JSBs 806 and one or more quality of service (QoS) capabilities 808. QoS capabilities 808 represent the capabilities, such as CPU speed, disk space, connectivity capability, bandwidth, etc., of the compute resource on which cybernode 801 runs.

Service instantiator object 802 is used by cybernode 801 to register its availability to support JSBs and to receive requests to instantiate JSBs. For example, using the Jini™ event handling process, service instantiator object 802 can register interest in receiving service provision events from a service provisioner, discussed below. A service provision event is typically a request to create a JSB. The registration process might include declaring QoS capabilities 808 to the service provisioner. These capabilities can be used by the service provisioner to determine what compute resource, and therefore what cybernode, should instantiate a particular JSB, as described in greater detail below. In some instances, when a compute resource is initiated, its capabilities are declared to the cybernode 801 running on the compute resource and stored as QoS capabilities 808.

Service bean instantiator object 804 is used by cybernode 801 to create JSBs 806 when service instantiator object 804 receives a service provision event. Using JSB attributes contained in the service provision event, cybernode 801 instantiates the JSB, and ensures that the JSB and its corresponding service remain available over the network. Service bean instantiator object 804 can be used by cybernode 801 to download JSB class files from a code server as needed.

Figure 9:
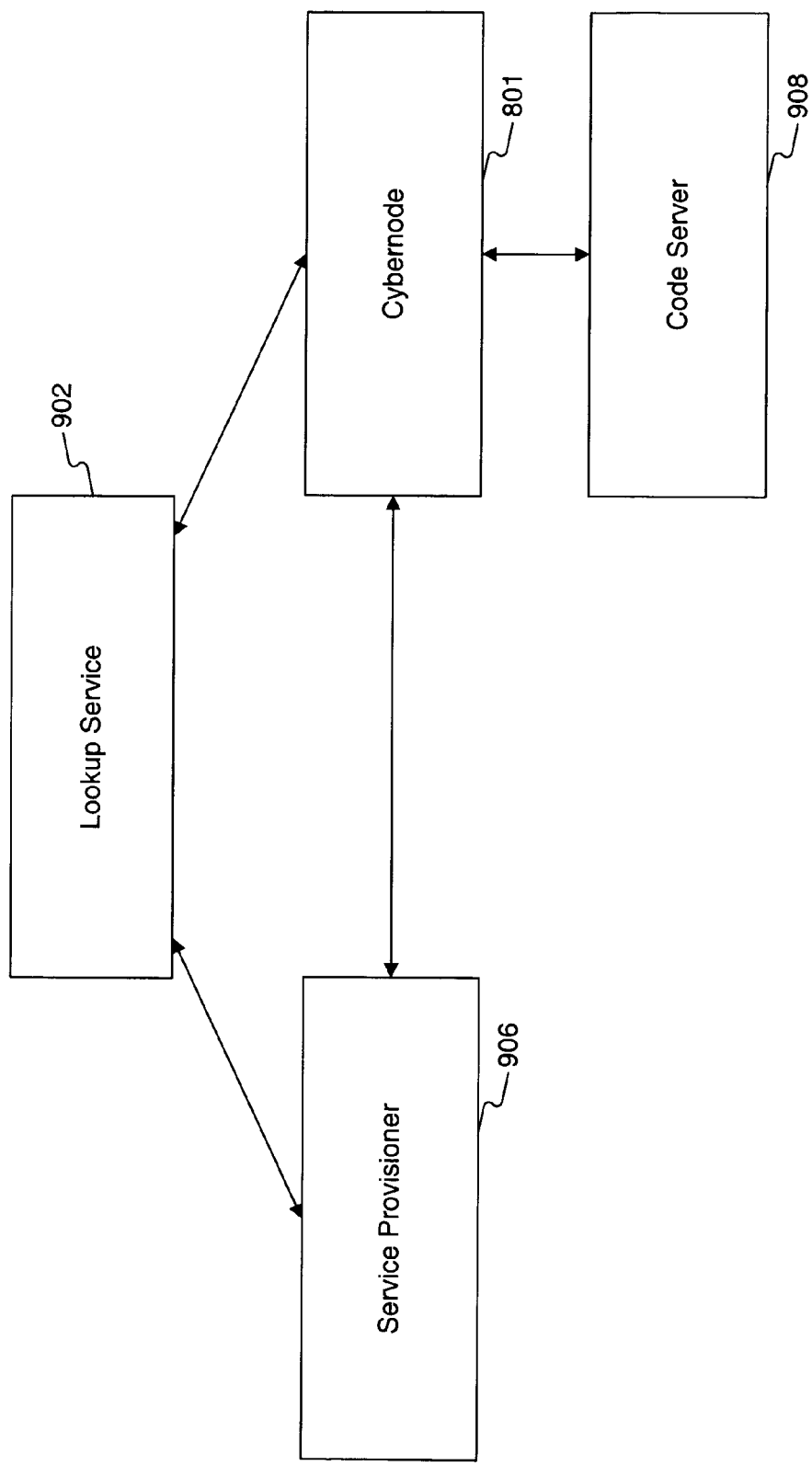
FIG. 9 depicts a block diagram of a system in which a cybernode interacts with a service provisioner, in accordance with the present invention.

FIG. 9 depicts a block diagram of a system in which a cybernode interacts with a service provisioner. This system includes a lookup service 902, a cybernode 801, a service provisioner 906, and a code server 908. As described above, cybernode 801 is an infrastructure service that supports one or more JSBs. Cybernode 801 uses lookup service 902 to make its services (i.e., the instantiation and support of JSBs) available over the distributed system. When a member of the distributed system, such as service provisioner 906, needs to have a JSB created, it discovers cybernode 801 via lookup service 902. In its lookup request, service provisioner 906 may specify a certain capability that the cybernode should have. In response to its lookup request, service provisioner 906 receives a proxy from lookup service 902 that enables direct communication with cybernode 801.

Figure 10:
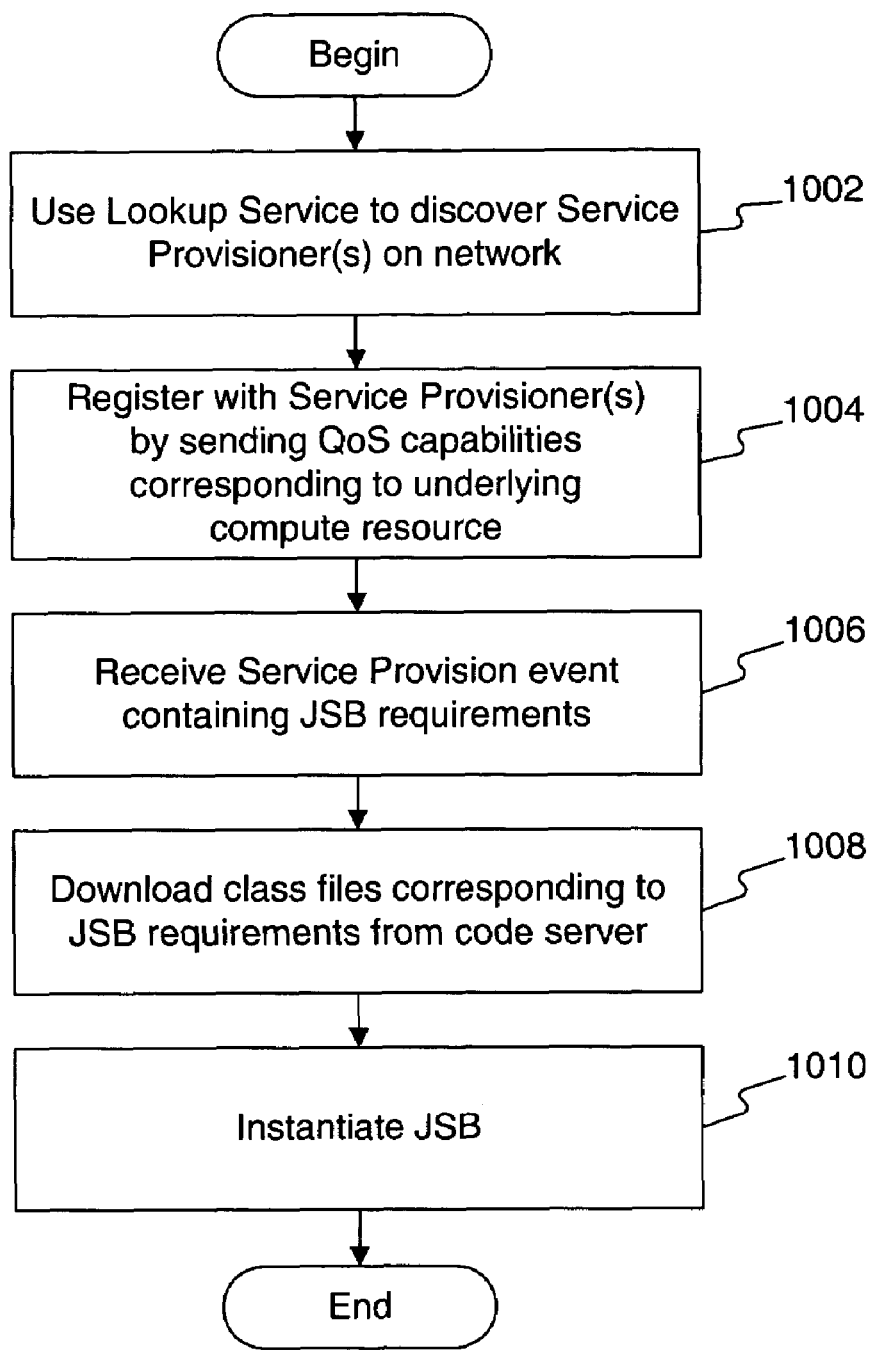
FIG. 10 is a flow chart of Jini Service Bean (JSB) creation performed by a cybernode, in accordance with the present invention.

FIG. 10 is a flow chart of JSB creation performed by a cybernode. A cybernode, such as cybernode 801, uses lookup service 902 to discover one or more service provisioners 906 on the network (step 1002). Cybernode 801 then registers with service provisioners 906 by declaring the QoS capabilities corresponding to the underlying compute resource of cybernode 801 (step 1004). When cybernode 801 receives a service provision event containing JSB requirements from service provisioner 906 (step 1006), cybernode 801 may download class files corresponding to the JSB requirements from code server 908 (step 1008). Code server 908 may be, for example, an HTTP server. Cybernode 801 then instantiates the JSB (step 1010).

As described above, JSBs and cybernodes comprise the basic tools to provide a service corresponding to a service element in an operational string consistent with the present invention. A service provisioner for managing the operational string itself will now be described.

Enhanced Event Handling

Systems consistent with the present invention may expand upon traditional Jini™ event handling by employing flexible dispatch mechanisms selected by an event producer. When more than one event consumer has registered interest in an event, the event producer can use any policy it chooses for determining the order in which it notifies the event consumers. The notification policy can be, for example, round robin notification, in which the event consumers are notified in the order in which they registered interest in an event, beginning with the first event consumer that registered interest. For the next event notification, the round robin notification will begin with the second event consumer in the list and proceed in the same manner. Alternatively, an event producer could select a random order for notification, or it could reverse the order of notification with each event.

Dynamic Service Provisioning

A service provisioner is an infrastructure service that provides the capability to deploy and monitor operational strings. As described above, an operational string is a collection of service elements that together constitute a complex service in a distributed system. To manage an operational string, a service provisioner determines whether a service instance corresponding to each service element in the operational string is running on the network. The service provisioner dynamically provisions an instance of any service element not represented on the network. The service provisioner also monitors the service instance corresponding to each service element in the operational string to ensure that the complex service represented by the operational string is provided correctly.

Figure 11:
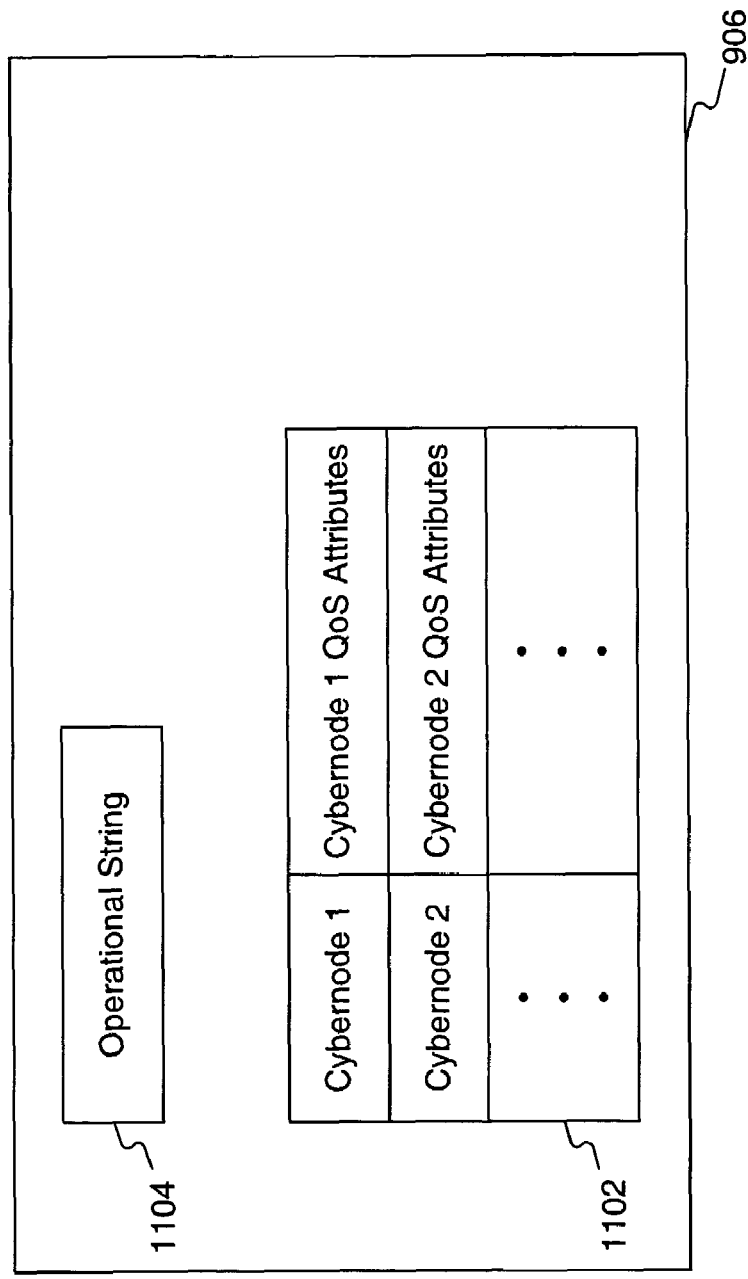
FIG. 11 is a block diagram of a service provisioner in greater detail, in accordance with the present invention.

FIG. 11 is a block diagram of a service provisioner in greater detail. Service provisioner 906 includes a list 1102 of available cybernodes running in the distributed system. For each available cybernode, the QoS attributes of its underlying compute resource are stored in list 1102. For example, if an available cybernode runs on a computer, then the QoS attributes stored in list 1102 might include the computer's CPU speed or storage capacity. Service provisioner 406 also includes one or more operational strings 1104.

Figure 12:
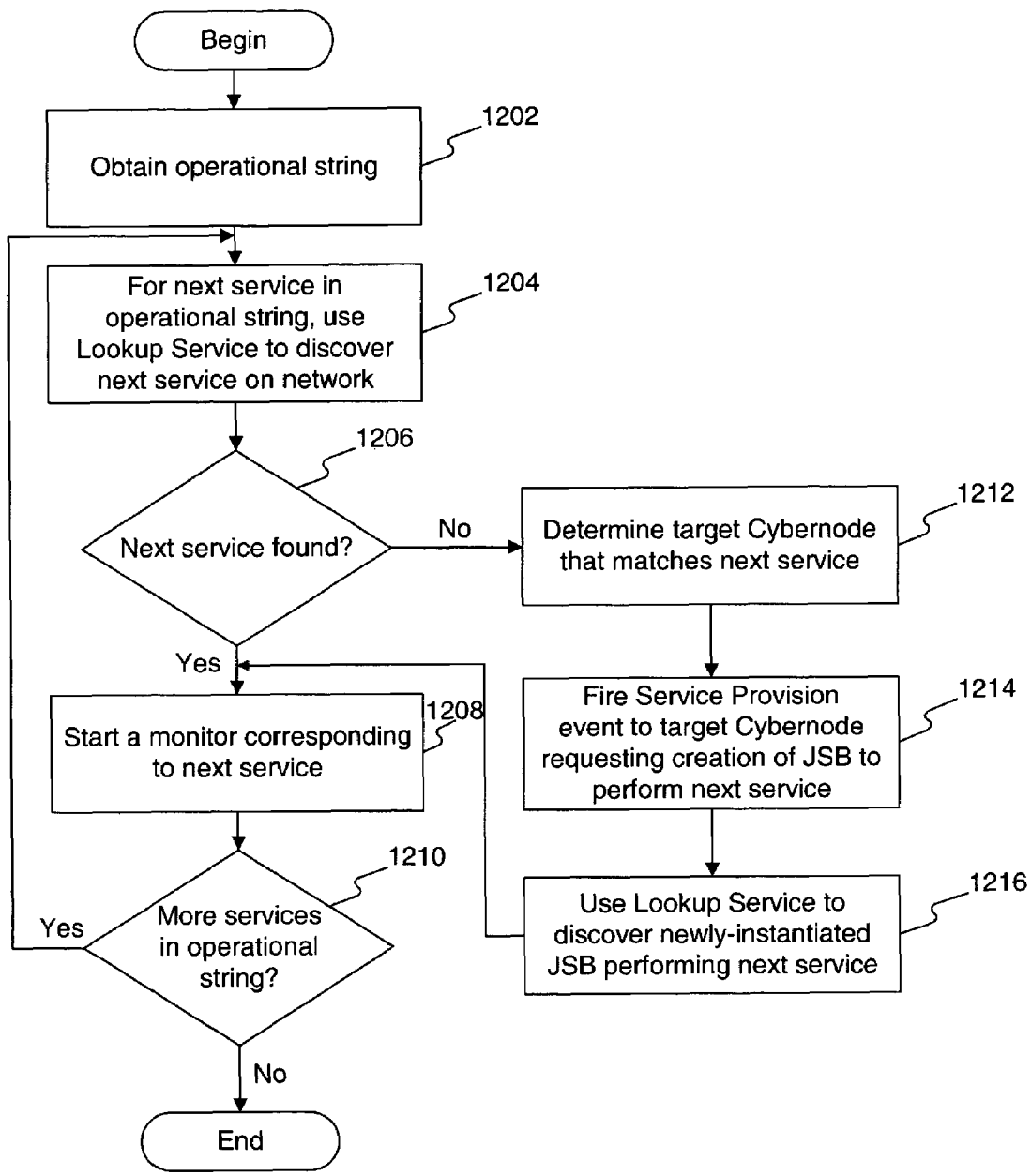
FIG. 12 is a flow chart of dynamic provisioning performed by a service provisioner, in accordance with the present invention.

FIG. 12 is a flow chart of dynamic provisioning performed by a service provisioner. Service provisioner 906 obtains an operational string consisting of any number of service elements (step 1202). The operational string may be, for example, operational string 502 or 504. Service provisioner 906 may obtain the operational string from, for example, a programmer wishing to establish a new service in a distributed system. For the first service in the operational string, service provisioner 906 uses a lookup service, such as lookup service 902, to discover whether an instance of the first service is running on the network (step 1204). If an instance of the first service is running on the network (step 1206), then service provisioner 906 starts a monitor corresponding to that service element (step 1208). The monitor detects, for example, when a service instance fails. If there are more services in the operational string (step 1210), then the process is repeated for the next service in the operational string.

If an instance of the next service is not running on the network (step 1206), then service provisioner 906 determines a target cybernode that matches the next service (step 1212). The process of matching a service instance to a cybernode is discussed below. Service provisioner 906 fires a service provision event to the target cybernode requesting creation of a JSB to perform the next service (step 1214). In one embodiment, the service provision event includes service bean attributes object 604 from service element 506. Service provisioner 906 then uses a lookup service to discover the newly instantiated JSB (step 1216) and starts a monitor corresponding to that JSB (step 1208).

As described above, once a service instance is running, service provisioner 906 monitors it and directs its recovery if the service instance fails for any reason. For example, if a monitor detects that a service instance has failed, service provisioner 906 may issue a new service provision event to create a new JSB to provide the corresponding service. In one embodiment of the present invention, service provisioner 906 can monitor services that are provided by objects other than JSBs. The service provisioner therefore provides the ability to deal with damaged or failed resources while supporting a complex service.

Service provisioner 906 also ensures quality of service by distributing a service provision request to the compute resource best matched to the requirements of the service element. A service, such as a software component, has requirements, such as hardware requirements, response time, throughput, etc. In one embodiment of the present invention, a software component provides a specification of its requirements as part of its configuration. These requirements are embodied in service provision management object 602 of the corresponding service element. A compute resource may be, for example, a computer or a device, with capabilities such as CPU speed, disk space, connectivity capability, bandwidth, etc.

In one implementation consistent with the present invention, the matching of software component to compute resource follows the semantics of the Class.isAssignableFrom(Class cls) method, a known method in the Java™ programming language that determines if the class or interface represented by the class object ("cls") is either the same as, or is a superclass or superinstance of, the class or interface represented by the specified "Class" parameter. If the class or interface represented by QoS class object of the software component is either the same as, or is a superclass or superinterface of, the class or interface represented by the class parameter of the QoS class object of the compute resource, then a cybernode resident on the compute resource is invoked to instantiate a JSB for the software component. Consistent with the present invention, additional analysis of the compute resource may be performed before the "match" is complete. For example, further analysis may be conducted to determine the compute resource's capability to process an increased load or adhere to service level agreements required by the software component.

Service provisioner 906 may ensure quality of service by distributing service provision requests to compute resources that are best matched to the requirements of a service element. Methods, systems and articles of manufacture consistent with certain features related to the present invention enable a provision manager to monitor and measure compute resource capabilities in a heterogeneous system to efficiently provision services. Further, aspects of the present invention allow a cybernode to monitor the capabilities of its corresponding compute resource to ensure Service Level Agreements (SLAs) are maintained. An SLA is a construct developed by a user (e.g., administrator) that defines a level of service for a corresponding compute resource.

In one aspect of the invention, a compute resource will monitor and maintain its defined service level agreement in accordance with a QoS framework consistent with certain features related to the present invention. For example, a user may define a service level agreement that reflects service level requirements of a user. For instance, a user may request that a compute resource operates with a processing module including at least six CPUs or within a particular type of processing architecture. Further, the SLA may stipulate that a CPU usage rate and a memory usage rate for the compute resource is not to exceed a predetermined threshold value, such as 80% and 40%, respectively. In one aspect of the invention, the SLA may also define a universal measurable resource cost value that a provision manager may use to assess the resource capabilities of the corresponding compute resource. The provision manager may receive resource cost values associated with a plurality of compute resources to determine an overall resource capability of a heterogeneous distributed system. Because a heterogeneous system may operate using resources having different types of hardware and software configurations (e.g., different processing platforms, operating systems, etc.), the capabilities of each resource may be difficult to manage and/or assess. Accordingly, certain aspects of the invention provide a framework that generates a homogeneous resource cost value for each heterogeneous resource included in a distributed system. A provision manager may use the cost value to determine resource capabilities for each resource and provision one or more services in the distributed system according to the determination.

Figure 13:
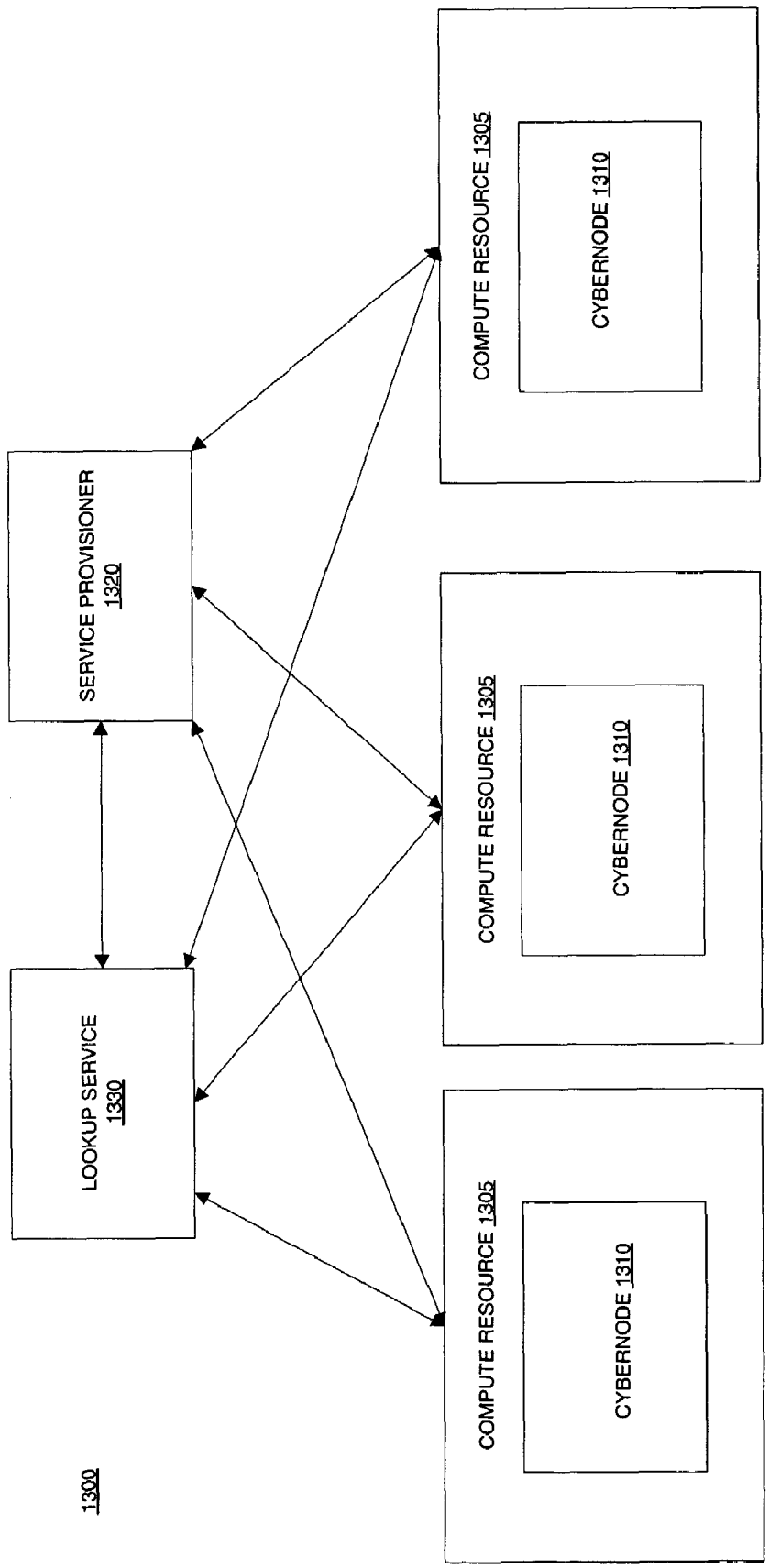
FIG. 13 is a block diagram of an exemplary dynamic QoS provisioning system environment consistent with certain aspects related to the present invention.

FIG. 13 shows an exemplary computing system 1300 consistent with certain aspects of the present invention. As shown, system 1300 includes a plurality of compute resources 1305, and corresponding cybernodes 1310, a service provisioner 1320, and a lookup service 1330.

Each compute resource 1305 may be a device, such as a computer 102, that includes hardware and software based resources. Each compute resource 1305 may based on similar or different platforms, such as different processing architectures and/or operating systems. Further, each compute resource may run a cybernode 1310 that is a lightweight dynamic container that represents the capabilities of the corresponding compute resource the cybernode runs on. Further, a cybernode 1310 provides SLA management services and discovers and enlists with service provisioner 1320 through lookup service 1330. For example, cybernode 1310 may interact with service provisioner 1320 in manner similar to that described above with respect to FIG. 9.

Each compute resource 1305 may have the capability to determine the type of services or support the resource may provide to a requesting entity, such as a software application. This capability considers one or more factors, such as qualitative and quantitative factors. A qualitative factor may be associated with a capability corresponding to one or more mechanisms operating with, or within, a compute resource. One exemplary qualitative factor may be a platform capability, such as a network capability (TCP, 802.11, Bluetooth, etc.), hardware and/or software capability (e.g., drivers, databases, etc.), etc. The platform capability of a compute resource may thus depend on the type of platform the resource is running (e.g., operating system), the types and number of support mechanisms (e.g., memory management devices/software, the number of processors running in the resource, etc. An exemplary quantitative factor may be a measurable capability that indicates a measurable depletion-oriented platform characteristic, such as CPU utilization, CPU capability, memory usage (e.g., disk space usage 0 to 100%), network bandwidth usage, and operating system resources that have an upper threshold count, such as synchronization primitives, threads, processes (e.g., light-weight processes) etc. Thus, the measurable capability of a compute resource at any point in time may depend on the availability of such depletion-oriented characteristics at that point in time. These exemplary capabilities may be used by a user and/or a process to define a SLA associated with a corresponding compute resource.

Service provisioner 1320 is a computing module (e.g., software and/or computer device) that manages the provisioning of services to one or more requesting entities (e.g., a process operating on a remote computing device included in system 1300). In one aspect of the invention, service provisioner 1320 may collect a set of resource capability objects that each map to a specific compute resource 1305 available in system 1300. Based on the collected resource capability objects, service provisioner 1320 may create a collection of resource capabilities based on platform capabilities and a homogeneous resource cost value for each compute resource. The resource cost value may be included in the resource capability object and represents an overall resource capability associated with a corresponding compute resource. For example, resource cost values may be provided as a quantifiable data value ranging from a minimum and maximum data value, such as 0 to 100% (e.g., 0 to 1.0). Accordingly, service provisioner 1320 may determine that a compute resource having a resource cost value of 0.7 may have a higher "goodness" value than a compute resource with a resource cost value of 0.4. This "goodness" value is a representation of a capability of a compute resource to provision a service in system 1300 and may be independent of the type of platform the compute resource is operating. Service provisioner 1320 may use one or more of these "goodness values" to identify those compute resources 1305 best suited to provision a service based on, for example, minimum platform capabilities for a desired service and the resource cost values. Accordingly, service provisioner 1320 determines the compute resources 1305 included in system 1300 that should be made available to one or more requesting entities.

Figure 14:
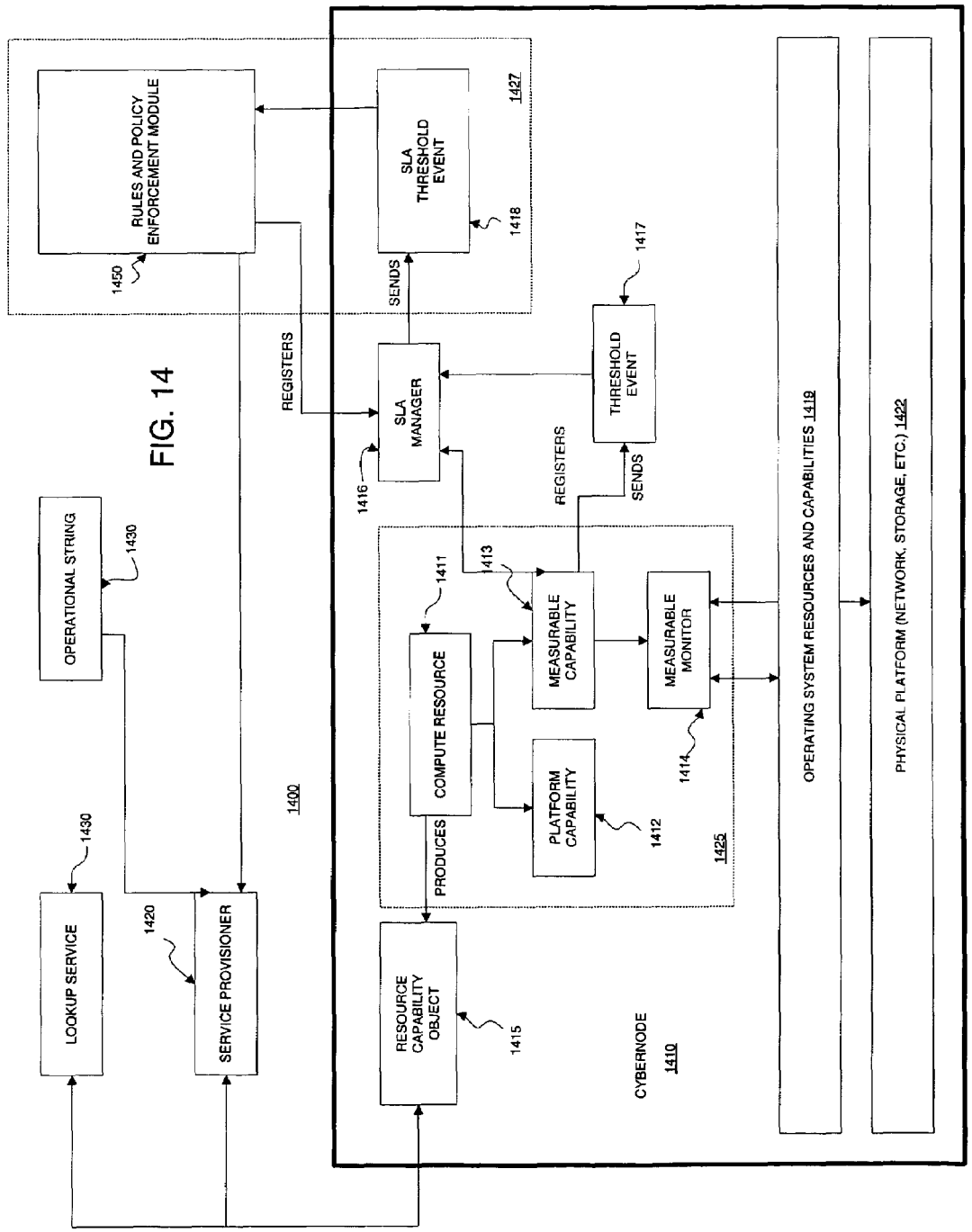
FIG. 14 is a block diagram of another exemplary dynamic QoS provision system environment consistent with certain aspects related to the present invention.

FIG. 14 shows a block diagram of an exemplary system 1400 associated with system 1300. The interaction between the elements shown in FIG. 14 is further described below with respect to the exemplary flowcharts illustrated in FIGS. 15, and 17-19.

As shown in FIG. 14, system 1400 includes a cybernode 1410, service provisioner 1420, and lookup service 1430, that may be similar to elements of the same designation in FIG. 13. Additionally, system 1400 includes operational string 1440 and Rules and Policy Enforcement module (RPE) 1350. Operational string 1440 may be similar to operational string 502 or 504 (FIG. 5) and represents a service (e.g., a complex service) that may be provisioned by service provisioner 1420. RPE 1450 may represent a computing module or a set of instructions that, when executed by a processor, perform as a computing module, that maintains and enforces rules and/or policies associated with threshold events for one or more SLAs. RPE 1450 may operate within the same framework as a compute resource or may be available over a network. As exemplified in FIG. 14, RPE 1450 is operating within a compute resource framework 1427 that is shared by cybernode 1410. Framework 1427 may be a collection of processes, objects, and other executable and non-executable forms of information that perform functions consistent with certain aspects of the present invention.

Cybernode 1410 may implement a QoS framework 1425 that creates and maintains a compute resource object 1411 that contains zero or more platform capability objects 1412 and zero or more measurable capability objects 1413. Platform capability object 1412 provides data reflecting the qualitative capabilities of the compute resource 1405 running cybernode 1405 (e.g., network capabilities, platform software, etc.). Measurable capability object 1413 provides data reflecting a quantitative capability of the compute resource 1405. In one aspect of the invention, each measurable capability object 1413 contains a measurable monitor object 1414 that periodically collects capability information from operating system resources and capabilities 1419 and/or physical platform 1422. Based on this collected information, measurable capability object 1413 may determine a resource cost value representing an overall capability, or "goodness" value, associated with the compute resource. In one aspect of the invention, compute resource object 1411 may periodically produce a resource capability object 1415 that contains the platform and measurable capability objects 1412 and 1413, and the resource cost value for the compute resource 1405. Resource capability object 1415 provides information on the suitability of the compute resource to provision a service through system 1400.

Cybernode 1410 may also instantiate SLA manager 1416 when compute resource 1405 instantiates a service, such as a service associated with operational string 1440. SLA manager 1416 is a computing entity (e.g., object) that manages the SLA associated with the compute resource the corresponding cybernode 1410 is located. In accordance with one aspect of the invention, SLA manager 1416 may receive a threshold event 1417 from measurable capability object 1413 and provide an SLA threshold event 1418 to RPE module 1450. Each of the objects (1411-1415) and SLA manager 1416 may be stored as program code in a memory device included in a compute resource (e.g., 1305).

Figure 15:
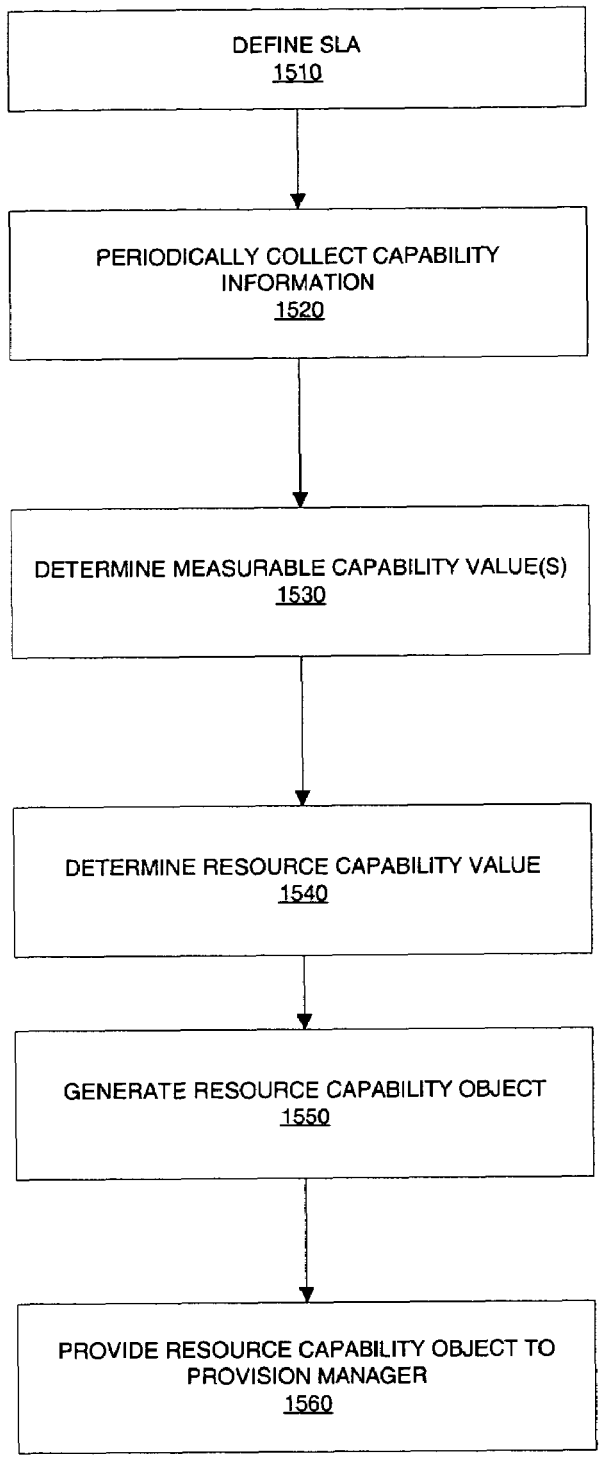
FIG. 15 is a flowchart of an exemplary resource capability process consistent with certain aspects related to the present invention.

FIG. 15 shows a flowchart of an exemplary resource capability process that may be performed by methods and systems consistent with certain aspects of the present invention. Initially, a user may create a service QoS definition for an operational string (e.g., 1440). Within the service QoS definition, the user may define a SLA that reflects the type of platform and measurable capabilities associated with the service (step 1510). For example, FIG. 16 shows an exemplary service QoS definition 1610 (illustrated as an extensible Markup Language (XML) document) for an exemplary operational string. Definition 1610 may include a platform capability requirement 1620 and a measurable criteria 1630. As shown, platform capability requirement 1620 defines certain qualitative capabilities, such as the requirement of a SPARC architecture and the use of 2 CPUs. The measurable criteria 1630 includes an SLA 1640 defined for QoS definition 1610. As illustrated, the exemplary SLA 1640 indicates that the resource cost value should not exceed 0.7 (e.g., 70%), the CPU usage rate should not exceed 0.8 (e.g., 80%), and the memory usage rate should not exceed 0.6 (e.g., 60%).

Returning to FIG. 15, once the SLA is defined, measurable monitor object 1414 may periodically (e.g., every minute, every hour, every day, etc.) collect capability information from operating system resources and capabilities module 1419 and physical platform 1422 associated with the compute resource running cybernode 1410 (step 1520). The capability information may include data reflecting current state information associated with one or more hardware and/or software components operating within module 1419 and platform 1422. For example, capability information may include data reflecting the current memory used in a one or more memory devices, the current usage rate of a processing module or controller, traffic information for one or more busses or communication links used by module 1419 and/or platform 1422, etc. Cybernode 1410 may dynamically adjust the period by which measurable monitor object 1414 collects the capability information. Measurable capability object 1413 may receive the collected capability information from measurable monitor object 1414 and determine a measurable capability value associated with the depletion-oriented platform characteristics associated with the compute resource (step 1530). For example, measurable monitor object 1414, at any point in time, may collect information from OS resource 1419 and physical platform 1422 that reflect CPU utilization and memory usage. Based on this collected information, measurable capability object 1413 may determine a CPU utilization value and a memory usage value for the compute resource.

Compute resource object 1411 may collect the measurable capability data from measurable capability object 1413 and platform capability data (e.g., qualitative capabilities) from platform capability object 1412 to determine a resource capability value reflecting an overall capability for the compute resource to provision a service (step 1540). Compute resource object 1411 may determine the resource capability value based on the performance of the compute resource in association with any criteria defined in the SLA corresponding to that compute resource. For example, consider a compute resource that is operating at a 79% CPU utilization rate and a 38% memory usage rate when the resource's SLA defines the CPU and memory usage threshold rates at 80% and 40%, respectively. Compute resource object 1411 may determine that the resource capability value for the exemplary compute resource at that point in time reflects a lower "goodness" value (e.g., universal representation of the cost of operating the compute resource) than a capability value for the same compute resource at a previous point in time that was operating at a 20% CPU and 20% memory usage rate. Thus, in the previous example, compute resource object may determine that the resource capability value for the first operating conditions is 0.6 (e.g., 60% cost value for the operating compute resource) while the resource capability value for the second operating conditions is 0.3 (e.g., 30% cost value). One skilled in the art will appreciate that the resource capability value may be configured in different formats using different types of values (e.g., integers, percentages, etc.) For example, a resource capability value of 0.7 may reflect a better "goodness" value than that of a lower capability value (e.g., 0.4).

Periodically (e.g., hourly, daily, etc.), compute resource object 1411 may generate a resource capability object 1415 that contains the platform and measurable capability objects 1412 and 1413, and the resource capability value determined by compute resource 1411 (step 1550). Resource capability object 1415 provides information on the suitability of the compute resource running cybernode 1410 to provision a service. Once created, cybernode 1410 may periodically provide or make available, resource capability object 1415 to service provisioner 1420 (step 1560).

Figure 17:
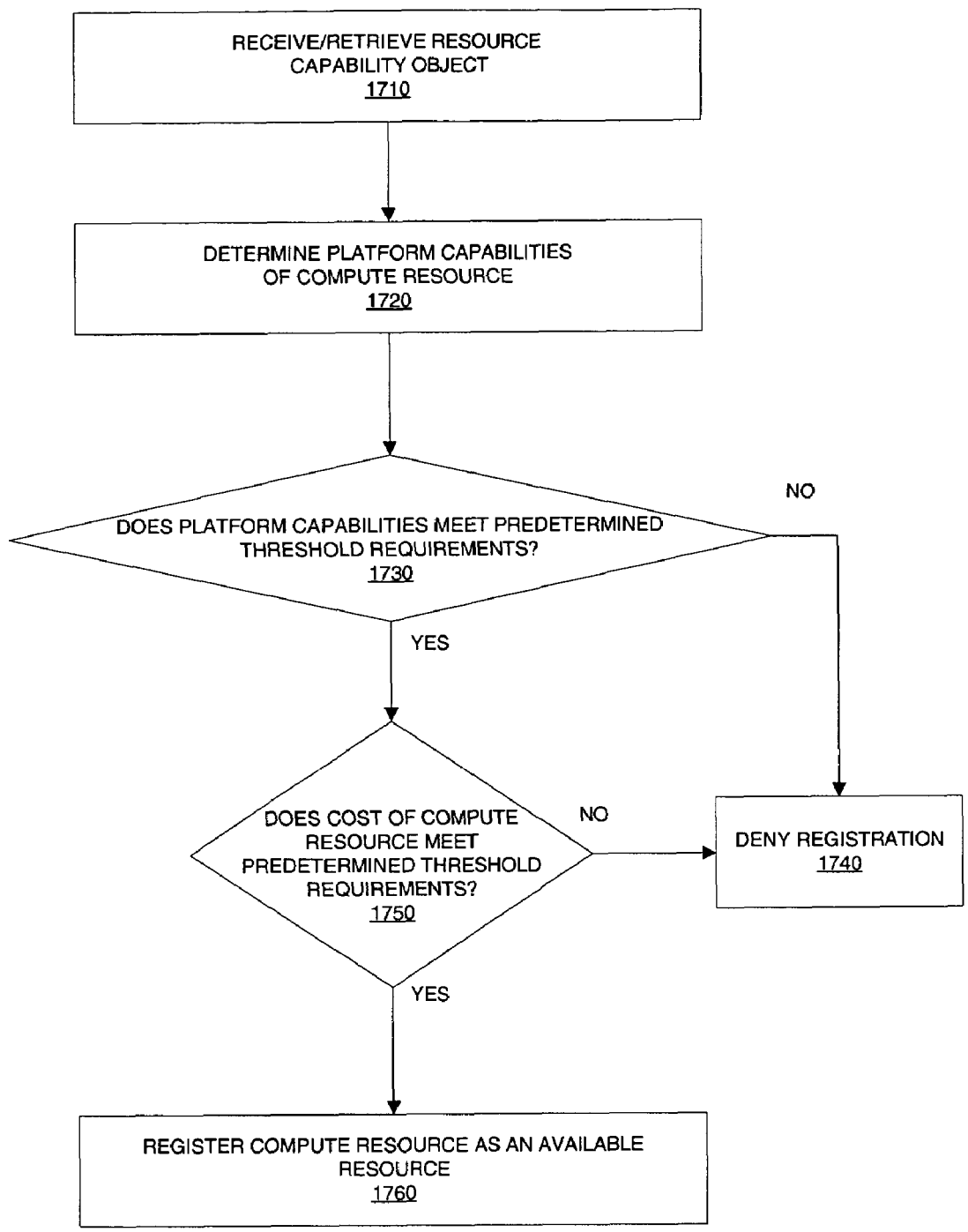
FIG. 17 is a flowchart of an exemplary compute resource registration process consistent with certain aspects related to the present invention.

In accordance with one aspect of the invention, one or more cybernodes 1410 may make a resource capability object 1415 available to service provisioner 1420. Based on the information included in a received capability object, service provisioner 1420 may assess whether the corresponding compute resource that provided the object is worthy of being represented in system 1300 as an available resource. For example, a compute resource that meets certain minimum performance and/or platform requirements may be a worthy (e.g., designated as a resource that meets these requirements) resource for providing a service to a requesting entity. A compute resource that is worthy of being an available resource FIG. 17 is a flowchart of an exemplary compute resource registration process that may be performed service provisioner 1420 to make such an assessment. As shown, service provisioner 1420 may periodically receive or retrieve a resource capability object 1415 from cybernode 1410 (step 1710). For example, service provisioner 1420 may periodically (e.g., hourly, daily, etc.) request a resource capability object 1415 from cybernode 1410, or alternatively, cybernode 1410 may periodically send resource capability object 1415 to service provisioner 1420.

Once a resource capability object 1415 is received, service provisioner 1420 may determine the platform capabilities of the compute resource associated with the received capability object 1415 (step 1720). To determine these capabilities, service provisioner 1420 may access the platform capability information provided by platform capability object 1412 and included in the resource capability object 1415. Manager 1420 may also determine whether the platform capabilities of the compute resource meets a predetermined threshold of requirements (step 1730). Service provisioner 1420 may make this determination based on one or more rules associated with the performance requirements of system 1300. For example, manager 1420 may require that a compute resource support certain capabilities (e.g., network capabilities, such as TCP) or includes certain services or software, such as particular databases, hardware devices with particular specifications, etc. One skilled in the art will appreciate that the types of criteria that service provisioner 1420 may implement to determined whether a compute resource meets a certain platform requirement may vary without departing from the scope of the invention. Accordingly, if the compute resource does not meet the platform capability requirements specified by service provisioner 1420, the compute resource will be denied registration (step 1740) (i.e., the provision manager 1420 will not present the compute resource as an available resource in system 1400).

On the other hand, if the platform capability requirements are met (step 1730; YES), service provisioner 1420 may determine whether a performance cost associated with the compute resource meets a predetermined threshold (step 1750). In one aspect of the invention, service provisioner 1420 may determine the performance cost based on the resource capability value determined by measurable capability object 1413. For example, service provisioner 1420 may determine that a compute resource with a resource capability value below a certain threshold value (e.g., 0.8) may not have enough available depletion-oriented resources to provide efficient services to a requesting entity. That is, the corresponding compute resource may be currently using too much CPU processes or memory, etc. such that the compute resource would not be able to provide a service to a requesting entity in an efficient manner. Accordingly, service provisioner 1420 may extract the resource capability value from the resource capability object provided by compute resource object 1411 and compare it to the threshold value. If the resource capability value is below the threshold value, service provisioner 1420 may deny registration (step 1740). Alternatively, if the resource capability value is above the threshold (step 1750; YES), service provisioner 1420 may determine that the corresponding compute resource is worthy of being presented as an available resource in system 1300 (step 1760).

Figure 18:
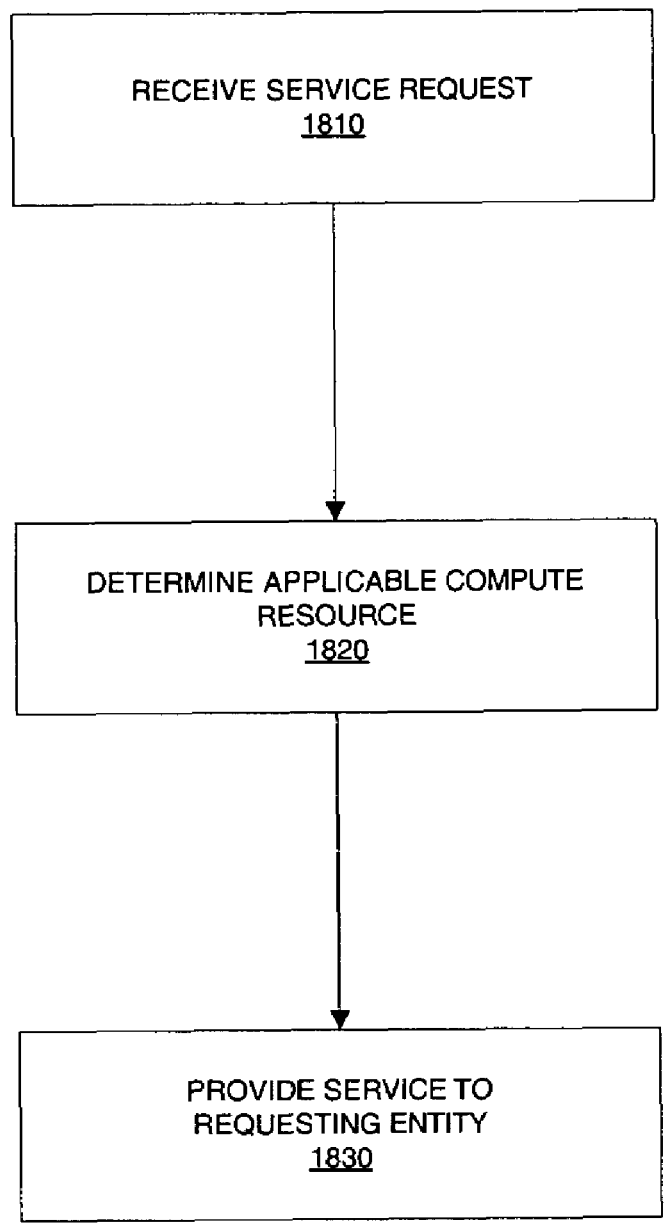
FIG. 18 is a flowchart of an exemplary service request process consistent with certain aspects related to the present invention.

In one aspect of the invention, once a compute resource is registered as an available resource, service provisioner 1420 may add an entry for the compute resource to a data structure (e.g., file, array, etc.) including a list of other registered compute resources. The entry may include data reflecting an identification of the compute resource, a resource capability value and platform capability information associated with the compute resource. The list may be sorted according to the platform capabilities and/or resource capability values included in each entry (e.g., from highest to lowest cost values). Service provisioner 1420 may use this list to process service requests from a requesting entity. FIG. 18 shows a flowchart of an exemplary service request process that may be performed by service provisioner 1420 consistent with aspects related to the present invention.

As shown in FIG. 18, service provisioner 1420 may receive a service request from a requesting entity, such as a client computer requesting access to a particular application, object, method, service, etc. (step 1810). Based on the request, manager 1420 may determine the most efficient or applicable compute resource to provide the requested service to the requesting entity (step 1820). Once determined, service provisioner 1420 may provide the service to the requesting entity (step 1830). Service provisioner 1420 may be configured to determine the most appropriate service (and corresponding compute resource) to handle the request based on a cost value associated with the service. Accordingly, the same type of process, code, algorithm, etc. that is used by service provisioner 1420 to determine whether a compute resource is worthy of being an available resource may be used to select the most appropriate service to process the request. In one aspect of the invention, service provisioner 1420 may compute a cost value for each service that is instantiated in system 1400 based on platform capabilities and measurable capabilities associated with the compute resource that is providing the corresponding service. Service provisioner 1420 may compare the cost values of each service to determine the most capable service (and compute resource) to handle the service request.

For example, consider an exemplary scenario where there are ten services of a certain type instantiated throughout the compute resources of system 1300. Further, suppose that a first user has sent a large processing task to one of the services of the certain type that causes the corresponding compute resource providing that one service to use 99% of its CPU processing capabilities. When a second user wants to locate a service of the same type as the first service to perform a less complicated task than the first user's task, service provisioner 1420 is configured to ensure that the second task is not sent to the first service and its corresponding compute resource because the first service is already over burdened (e.g., CPU usage is high). Accordingly, service provisioner 1420 may be configured to determine a cost value associated with each instantiated foo service in the exemplary scenario based on the current depletion-oriented capability of the compute resource that is running the service. Manager 1420 may use the service cost value to identify and provide a viable service (and corresponding compute resource) to handle the second user's task.

Figure 19:
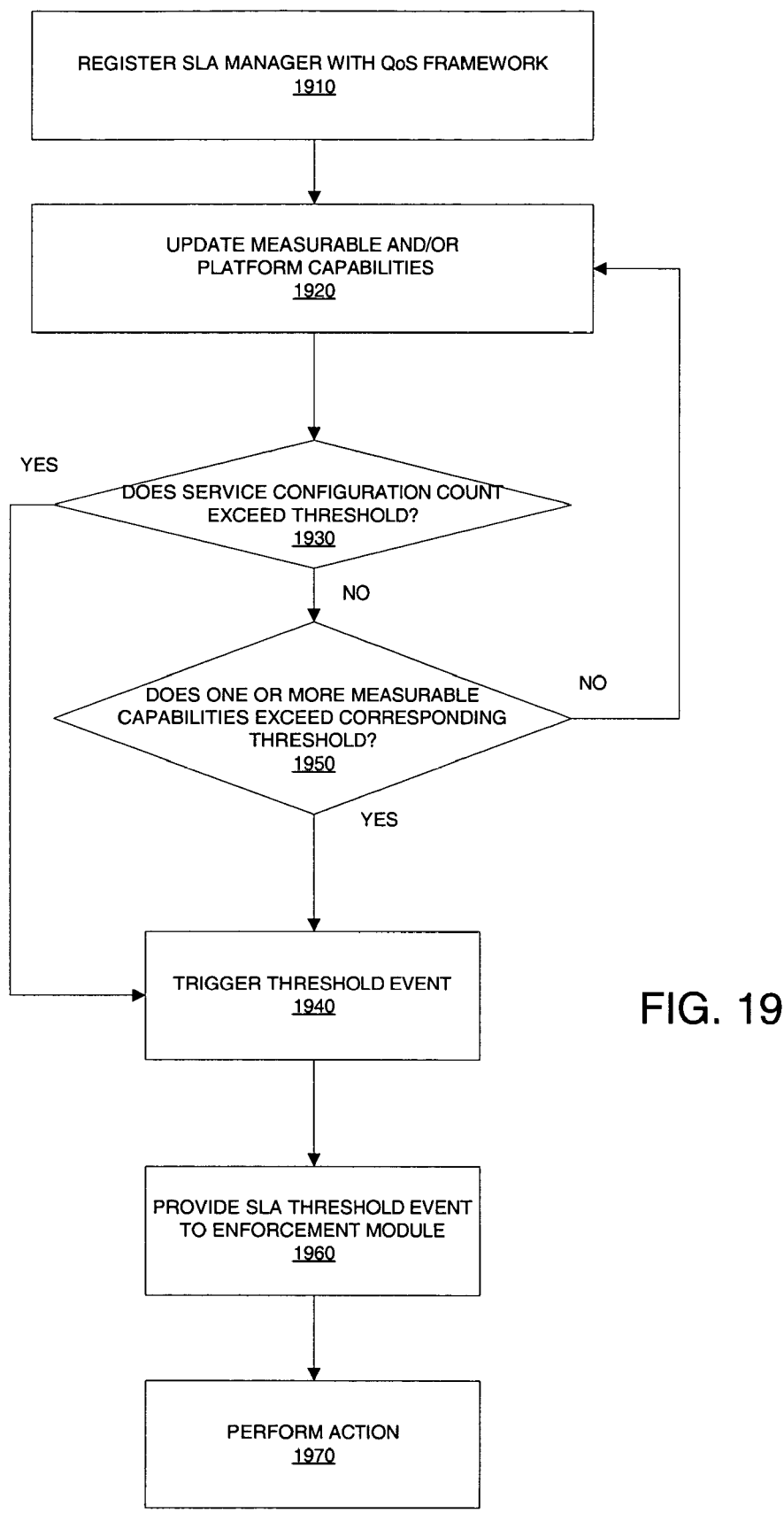
FIG. 19 is a flowchart of an exemplary QoS capability monitoring process consistent with certain aspects related to the present invention.

When a cybernode and its corresponding compute resource instantiates a service, an SLA manager 1416 is instantiated as part of the service. SLA manager 1416 may be configured to monitor the capabilities of cybernode 1410 to ensure it maintains the minimum capabilities defined in an SLA associated with cybernode 1410. FIG. 19 shows a flowchart of an exemplary QoS capability monitoring process that may be performed by cybernode 1410 consistent with certain aspects related to the present invention. Initially, when SLA manager 1416 is instantiated with a service, it registers with QOS framework 1425 through measurable capability object 1413 (step 1910). The registration allows measurable capability object 1413 to recognize SLA manager 1416 as a receiver for threshold events that may be produced by measurable capability object 1413.

During runtime, cybernode 1413 may periodically update its measurable and platform capabilities based on changes caused by performing the instantiated service or services (step 1920). For example, measurable monitor object 1414 may periodically (e.g., every 5 minutes, hourly, daily, etc.) check the state of any quantitative capabilities (CPU usage, memory usage, etc.) from OS resources and capabilities 1419. Further, platform capability object 1412 may periodically determine whether a specific mechanism associated with compute resource 1411 has changed, such as a database or driver experiencing a fault, etc. Based on the periodic monitoring, compute resource object 1411 may invoke a method on service provisioner 1420 that allows cybernode 1410 to update its corresponding resource capability object 1415 managed by service provisioner 1420. Additionally, or alternatively, compute resource object 1411 may periodically update the resource capability object 1415 maintained by cybernode 1410.

In addition to updating capability object 1415, cybernode 1410 may allow measurable capability object 1413 to provide threshold events to SLA manager 1416 based on the updated capabilities determined in step 1920. In one aspect of the invention, measurable capability object 1413 provides a threshold event 1417 to SLA manager 1416 based on monitored criteria. For example, measurable capability object 1413 may determine whether a cybernode service configuration count has exceeded its threshold (step 1930). A service configuration count reflects a number of tasks, processes, and any other type of requesting entity that is currently using the instantiated service provided by cybernode 1410. For example, cybernode 1410 may define a maximum threshold of 500 service configurations. Accordingly, if the service provided by cybernode 1410 is currently handling 500 configurations and receives another service request, measurable capability object 1413 may provide a threshold event 1417 to SLA manager 1416 that identifies the type of threshold violation (e.g., service configuration count exceeded).

Accordingly, if measurable capability object 1413 determines that a configuration count threshold has been exceeded (step 1930; YES), a threshold event is triggered (step 1940). On the other hand, if the threshold has not been exceeded (step 1930; NO), measurable capability object 1413 may determine whether one or more measurable capabilities defined in the SLA for cybernode 1410 exceeds its defined threshold value (step 1950). For example, if measurable capability object 1413 determines that the CPU usage rate for compute resource 1411 defined in SLA 1640 exceeds 80%, a corresponding threshold event 1417 may be triggered. Further, if the exemplary memory usage rate for compute resource 1411 exceeds the exemplary threshold defined in SLA 1640, a corresponding threshold event may be triggered. If more than one measurable capability defined in an SLA has exceeded its threshold, measurable capability object 1413 may generate a single threshold event 1417 that includes information associated with these exceeded capabilities.

In accordance with another aspect of the invention, measurable capability object 1417 may be configured to provide a threshold event when it updates its capabilities in step 1920. In this case, the threshold event 1417 may include the current updated measurable and platform capabilities for compute resource 1411. SLA manager 1416 may then perform monitoring functions similar to those associated with steps 1930 and 1950 to determine whether the service configuration count and/or an SLA capability has been exceeded by compute resource 1411.

In the event one or more measurable capabilities defined in the SLA has not been exceeded (e.g., compute resource is running below the CPU and memory utilization rates defined in SLA 1640), cybernode 1410 may allow the compute resource to continue providing the service. Thus, the monitoring process continues at step 1920. If, however, one or more of the measurable capabilities have been exceeded (step 1950; YES), a threshold event may be triggered by measurable capability object 1413 and provided to SLA manager 1416 (step 1940). Based on the threshold event, SLA manager 1416 may send a corresponding SLA threshold event 1418 to RCE module 1450 through framework 1427 (step 1960). In accordance with one aspect of the invention, SLA threshold event includes information associated with the type of threshold exceeded (e.g., service configuration count, type of measurable capability exceeded, etc.).

RCE module 1450 receives SLA threshold event 1418, and based on the information included therein, RCE module 1450 determines one or more actions that are to be performed to handle the corresponding threshold violation(s) (step 1970). The action(s) may be performed by RCE module 1450 and/or service provisioner 1420. An action may include, but is not limited to, moving the service running on compute resource 1411 to another cybernode in system 1300 and/or providing an indication of the threshold event to a user via one or more communication mediums (e.g., pager, e-mail, automated voice response for telephone systems, displaying a message on a display device, etc.). Further, an action may include causing the compute resource to end its registration with service provisioner 1420 as an available resource on system 1300.

For example, when cybernode 1411 provides a resource capability object 1415 to service provisioner 1420 and is subsequently registered as an available resource in system 1300, cybernode 1410 may be granted a lease to receive events from provisioner 1420. A lease may be a mechanism that binds access to, and/or the use of, a service, resource, provided by an entity for period of time. Thus, in the above exemplary case, the granted lease allows cybernode 1410 to receive, or consume, events from provisioner 1420 for a period of time. The period of time, known as a lease period, may be based on temporal value (e.g., 10 seconds), or one or more conditions. Accordingly, as an available resource, cybernode 1410 is an event consumer that may receive service events from provision manager 1410 to handle one or more requests from a requesting entity. When compute resource 1411 is no longer capable of providing efficient services based on the capabilities defined in its SLA (e.g., SLA threshold event for an exceeded CPU usage rate), enforcement module 1450 may cancel the lease held by cybernode 1410.

Alternatively, cybernode 1410 may be configured to cancel its own lease without the aid of enforcement module 1450. Thus, when its lease is canceled, cybernode 1410 may not be considered as an available resource in system 1300 and allows compute resource 1411 to continue to monitor its measurable and platform capabilities until the platform capability and/or its resource capability value meets an acceptable level based on changes in one or more of the SLA capabilities defined in the SLA for cybernode 1410. Accordingly, if compute resource 1411 determines that its capabilities meet the SLA requirements, it may create another resource capability object 1415 (or update a previously generated resource capability object) and provide the resource capability object to service provisioner 1420 to (re-)register as an available resource on system 1300.

As described, systems, methods, and articles of manufacture consistent with certain aspects related to the present invention enable a cybernode to register a compute resource with a provision manager based on dynamically changing QoS capabilities. The cybernode may provide a resource capability object that includes a cost value that reflects the ability for the cybernode to provision a service. The provision manager may collect a plurality of cost values for corresponding other cybernodes and provision services to a requesting entity based on the cost values of each cybernode and/or services that are currently instantiated by the cybernodes. Accordingly, a cost value is provided by each cybernode that is used by the provision manager to enable it to assess the capabilities of the cybernodes and provision a service that has the best opportunity to provide the most efficient resources. Because the cost value is in a universal format, the provision manager may easily assess the capabilities of heterogeneous compute resources to efficiently provision the service.

Further, certain aspects of the present invention allow a cybernode to dynamically monitor its own QoS capabilities and remove itself as an available resource when it determines at any point in time that its compute resource cannot provide a service efficiently. The cybernode may continue to monitor its QoS capabilities and re-register with provision manager when it meets certain QoS capability requirements defines in a SLA.

The foregoing description of implementations of the invention has been presented for purposes of illustration and description. It is not exhaustive and does not limit the invention to the precise form disclosed. Modifications and variations are possible in light of the above teachings or may be acquired from practicing of the invention. Additional modifications and variations of the invention may be, for example, the described implementation includes software but the present invention may be implemented as a combination of hardware and software or in hardware alone. The invention may be implemented with both object-oriented and non-object-oriented programming systems. For instance, system 1300 may be configured perform QoS dynamic provisioning services in a web services environment. For example, system 1300 may include a web controller that uses a lookup service to notify the controller when any service is instantiate that uses a Web Application aRchive (WAR) description. When the web controller receive such a notification, it may go to a Universal Resource Indicator (URI) included in the WAR descriptor to obtain the WAR and its associated resources and install it into a web container. From the web container, the WAR and associated resources may be made available as a resource in system 1300 through service provisioner 1320.

Additionally, the processes described above with respect to FIGS. 15 and 17-19 are not limited to the sequences illustrated in these figures. One skilled in the art will appreciate that variations to the sequence of steps included in these processes may vary without departing from the scope of the invention. Further, additional steps may be included in these processes to provide the dynamic QoS provisioning features consistent with aspects of the invention. For example, the exemplary QoS capability monitoring process shown in FIG. 19 may include additional step(s) for determining whether the platform capabilities associated with the compute resource meet the threshold platform capabilities defined in the QoS definition (e.g., element 1620 of FIG. 16). Cybernode 1410 maybe be configured to trigger a threshold event when one or more of the platform capabilities of the compute resource does not meet the platform threshold capabilities, which subsequently may resulting RCE module 1450 performing an appropriate action (e.g., canceling the lease held by the cybernode 1410, notifying a user, moving the server provided by the compute resource, etc.).

Furthermore, one skilled in the art would recognize the ability to implement the present invention in many different situations. For example, the present invention can be applied to the telecommunications industry. A complex service, such as a telecommunications customer support system, may be represented as a collection of service elements such as customer service phone lines, routers to route calls to the appropriate customer service entity, and billing for customer services provided. The present invention could also be applied to the defense industry. A complex system, such as a battleship's communications system when planning an attack, may be represented as a collection of service elements including external communications, weapons control, and vessel control.

Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method for providing a service in a distributed system, comprising:
    collecting capability information reflecting a current operating condition of a compute resource, wherein the compute resource comprises a computer system;
    determining a measurable capability value for a depletion-oriented characteristic of the computer system based on the collected capability information;
    determining a platform capability for the computer system;
    determining a capability value for the computer system based on at least one of the platform capability and the measurable capability value, wherein the capability value reflects an overall ability for the compute resource to provide the service based on at least one of the platform capability and the measurable capability value and the overall ability for the compute resource reflected in the capability value is directly proportional to a fluctuation of the depletion-oriented characteristic;
    providing the capability value to a provision manager that designates the computer system as an available resource in the distributed system based on the capability value;
    providing software for the service on the computer system in the distributed system;
    dynamically instantiating a Service Level Agreement manager on the computer system upon said providing software for the service, wherein the Service Level Agreement manager ensures that minimum capabilities defined in the Service Level Agreement are maintained; wherein
    the provision manager determines whether the compute resource is to be designated an available resource in the distributed system based on the capability value and another capability value associated with another compute resource included in the distributed system; and
    providing the service by the computer system to a requesting entity based on a determination from the provision manager that the compute resource is more capable of providing the service than another compute resource included in the distributed system.

2. The method of claim 1, wherein the depletion-oriented characteristic of the computer system is a measurable platform characteristic comprising at least one of memory usage, processor utilization, network bandwidth usage, and an operating system resource, associated with the compute resource, having an upper threshold value.

3. The method of claim 1, wherein the platform capability reflects at least one of hardware and software based capabilities that are associated with the compute resource.

4. The method of claim 1, wherein the determination from the provision manager that the compute resource is more capable of providing the service than the another compute resource is based on the capability value.

5. The method of claim 1, wherein providing the capability value includes:
    creating a resource capability object that includes the capability value; and
    providing the resource capability object to the provision manager.

6. The method of claim 5, wherein the compute resource may update the resource capability object based on changes to at least one of the platform capability and the depletion-oriented characteristic.

7. The method of claim 6, wherein the compute resource updates the resource capability object by invoking a method provided by the provision manager.

8. The method of claim 1, wherein the capability information is collected periodically.

9. The method of claim 1, wherein the capability value is provided to the provision manager periodically.

10. A method for providing a service in a distributed system, comprising:
    collecting a resource capability object from a compute resource, wherein the compute resource provides the service and comprises a computer system;
    determining a measurable QoS capability associated with a depletion-oriented characteristic of the computer system;
    determining whether the computer system satisfies a QoS capability threshold based on the resource capability object, wherein the resource capability object reflects an overall ability for the compute resource to provide the service, and the overall ability for the compute resource reflected in the resource capability object is directly proportional to a fluctuation of the depletion-oriented characteristic;
    registering the computer system as an available resource in the distributed system based on the determination;
    providing software for the service on the computer system in the distributed system;
    dynamically instantiating a Service Level Agreement manager on the computer system upon said providing of software for the service, wherein the Service Level Agreement manager ensures that minimum capabilities defined in the Service Level Agreement are maintained;
    receiving a service request from a requesting entity; and
    determining that the compute resource is more capable of providing the requested service to the requesting entity using the service than the second compute resource included in the distributed system that provides a second service; and providing, by the computer system, the requested service to the requesting entity.

11. The method of claim 10, wherein a platform capability is associated with a capability provided by a hardware or software mechanism operating within the compute resource.

12. The method of claim 10, wherein the depletion-oriented characteristic of the computer resource is a measurable platform characteristic comprising at least one of a memory usage, processor utilization, network bandwidth usage, and an operating system resource, associated with the compute resource, having an upper threshold value.

13. The method of claim 10, wherein determining whether the compute resource satisfies a QoS capability threshold includes:
    determining whether a resource capability value reflecting a capability associated with a depletion-oriented characteristic of the compute resource is one of greater than, equal to, and less than, a predetermined capability threshold value.

14. The method of claim 13, wherein the resource capability value is determined by the compute resource and is included in the resource capability object provided by the compute resource.

15. The method of claim 10, wherein registering the compute resource as an available resource includes:
    providing an entry for the compute resource in a data structure including other identifiers for other registered compute resources.

16. The method of claim 10, wherein determining that the compute resource is more capable of providing the service includes:
    comparing a first cost value associated with the service and a second cost value associated with the second service; and
    providing the service to the requesting entity based on the comparison.

17. The method of claim 16, wherein the first and second cost values are associated with one or more depletion-oriented characteristics of the compute and second compute resources, respectively.

18. The method of claim 10, wherein determining whether the compute resource satisfies a QoS capability threshold includes:
    comparing a resource capability value associated with a depletion-oriented characteristic of the compute resource with a corresponding QoS capability threshold value.

19. A system for providing a service in a distributed system, comprising:
    a provision manager configured to provide the service to a requesting entity based on a service capability value corresponding to each of a plurality of services instantiated in the distributed system; and
    a computer system that provides one of the instantiated services, said computer system being configured to monitor a QoS capability of the computer system, determine a resource capability value of the computer system reflecting an overall ability for the computer system to provide the instantiated service based on the monitored QoS capability, provide the capability value to the provision manager, and dynamically instantiate a Service Level Agreement manager on the computer system upon said provision manager providing said service, wherein the Service Level Agreement manager ensures that minimum capabilities defined in the Service Level Agreement are maintained, wherein the capability value reflects an overall ability for a compute resource to provide the service, and the overall ability for the compute resource reflected in the capability value is directly proportional to a fluctuation of a depletion-oriented characteristic of the computer system; and
    the provision manager determines whether the computer system is to be designed an available resource in the distributed based on the capability value and another capability value associated with another computer system included in the distributed system.

20. The system of claim 19, wherein the provision manager determines that computer system is capable of providing the instantiated service to the requesting entity based on a service capability value associated with the instantiated service.

21. The system of claim 20, wherein the service capability value associated with the instantiated service is based on the resource capability value.

22. The system of claim 19, wherein the computer system is configured to remove itself as an available resource based on a determination that the QoS capability does not meet a QoS threshold.

23. The system of claim 19, further including:
    an enforcement module that performs an action based on an event provided by the computer system indicating that the QoS capability does not meet a QoS threshold.

24. The system of claim 23, wherein the action includes canceling a lease held by the computer system with the provision manager.

25. The system of claim 23, wherein the action includes one of canceling a lease held by the computer system with a provision manager, providing a notification to a user identifying the depletion-oriented characteristic, and moving the service provided by the computer system to another compute resource included in the distributed system.

26. The system of claim 19, wherein the computer system includes a monitoring object that periodically monitors the QoS capability of the computer system.

27. The system of claim 19, wherein the computer system includes a compute resource object that determines the resource capability value of the computer system.

28. The system of claim 27, wherein the compute resource object provides a resource capability object including the capability value to the provision manager.

29. The system of claim 19, wherein the resource capability value is a value that is independent of a type of platform of the computer system.

30. The system of claim 19, wherein the provision manager compares the resource capability value of the computer system with a second resource capability value of a second compute resource to determine whether the computer system is worthy of being an available resource in the distributed system.

31. The system of claim 30, wherein the second computer system includes a platform architecture that is different that a platform architecture of the computer system.

32. A computer-readable storage medium including instructions for, when executed by a processor, performing the method of claim 1.

33. A computer-readable storage medium including instructions for performing a method, when executed by a processor, for providing a service in a distributed system, the method comprising:
    providing software for the service on a computer system in the distributed system;
    dynamically instantiating a Service Level Agreement manager on the computer system upon said provision of software for the service, wherein the Service Level Agreement manager ensures that minimum capabilities defined in the Service Level Agreement are maintained;

collecting a resource capability object from the compute resource, wherein the compute resource provides the service and comprises the computer system;

determining a measurable QoS capability associated with a depletion-oriented characteristic of the compute resource does not exceed an amount defined in the SLA manager;

determining whether the compute resource satisfies a QoS capability threshold based on the resource capability object, wherein the resource capability object reflects an overall ability for the compute resource to provided the services, and the overall ability for the compute resource reflected in the resource capability object is directed proportional to fluctuation of the depletion-oriented characteristic;

registering the compute resource as an available resource in distributed system based on the determination;

receiving a service request from a requesting entity; and determining that the compute resource is more capable of providing the requested service to the requesting entity using the service than a second compute resource included in the distributed system that provides a second service.

34. A system for providing a service, comprising:
a memory including:
   a set of instructions for receiving a depletion-oriented resource capability value from each of a number of computer resource in a distributed system, wherein:
      a computer resource comprises a computer system;
      the depletion-oriented resource capability value is a measurable platform characteristic comprising at least one of processor utilization, network bandwidth usage, and an operating system resource, associated with a respective computer resource, having an upper threshold value; and
      the capability value reflects an overall ability for the computer resource to provide a service, and the overall ability for the computer resource reflected in the capability value is directly proportional to a fluctuation of the depletion-oriented characteristic;
   a set of instructions for determining which of the compute resources is more capable of providing a service to a requesting entity based on each compute resource's depletion-oriented capability value, and
   a set of instructions for providing software for the service on a computer system and dynamically instantiating a Service Level Agreement manager on the computer system, upon said provision of software for the service, to the requesting entity based on the determination and for monitoring the capability value of the computer system while the service is provisioned, wherein the Service Level Agreement manager ensures that minimum capabilities defined in the Service Level Agreement are maintained; and a provision manager determines whether the computer resource is to be designated an available resource in the distributed system based on the capability value and another capability value associated with another computer resource included in the distributed system; and a processor for executing the sets of instructions included in the memory.

35. A system, comprising:
a memory including:
   a set of instructions for determining a depletion-oriented resource capability value for each of number of computer resources in a distributed system, wherein the depletion-oriented capability value represents an overall ability of the computer resource to provision a service that is directly proportion to a fluctuation of the depletion-oriented characteristic:
      a computer resource comprises a computer system, and the depletion-oriented resource capability value is a measurable platform characteristic comprising at least one of processor utilization, network bandwidth usage, and an operating system resource, associated with a respective computer resource, having an upper threshold value,
   a set of instructions for registering as an available resource with a provision manager based on the depletion-oriented resource capability value,
   a set of instructions for providing software for the service on a computer system and dynamically instantiating a Service Level Agreement manager on the computer system, upon said provision of software for the service; and
   a set of instructions for monitoring QoS capabilities of the computer system using the instantiated Service Level Agreement manager to monitor the computer system and determine whether the compute resource is currently able to provision the service based on one or more QoS threshold values, wherein the Service Level Agreement manager ensures that minimum capabilities defined in the Service Level Agreement are maintained; and
   the provision manager determines whether the computer resource is to be designated an available resource in the distributed system based on the capability value and another capability value associated with another computer resource included in the distributed system; and a processor for executing the sets of instructions included in the memory.

* * * * *

UNITED STATES PATENT AND TRADEMARK OFFICE
CERTIFICATE OF CORRECTION

PATENT NO. : 7,660,887 B2  Page 1 of 1
APPLICATION NO. : 10/390895
DATED : February 9, 2010
INVENTOR(S) : Reedy et al.

It is certified that error appears in the above-identified patent and that said Letters Patent is hereby corrected as shown below:

Column 22, line 6, delete "designed" and insert therefor --designated--.
Column 22, line 7, after "distributed", insert --system--.
Column 23, line 13, delete "provided" and insert therefor --provide--.
Column 23, line 14, delete "services" and insert therefor --service--.
Column 23, line 15, delete "directed" and insert therefor --directly--.
Column 23, line 16, after "to", insert --a--.
Column 23, line 19, after "in", insert --the--.

Signed and Sealed this

Fourth Day of May, 2010

David J. Kappos
*Director of the United States Patent and Trademark Office*